US009086875B2

(12) United States Patent
Harrat et al.

(10) Patent No.: US 9,086,875 B2
(45) Date of Patent: Jul. 21, 2015

(54) CONTROLLING POWER CONSUMPTION OF A MOBILE DEVICE BASED ON GESTURE RECOGNITION

(75) Inventors: Newfel Harrat, Burlingame, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 12/792,600

(22) Filed: Jun. 2, 2010

(65) Prior Publication Data

US 2010/0313050 A1   Dec. 9, 2010

Related U.S. Application Data

(60) Provisional application No. 61/184,437, filed on Jun. 5, 2009.

(51) Int. Cl.
*G06F 1/32* (2006.01)
*G06F 3/01* (2006.01)
*H04W 52/02* (2009.01)

(52) U.S. Cl.
CPC ............ *G06F 1/3203* (2013.01); *G06F 1/3293* (2013.01); *G06F 3/017* (2013.01); *H04W 52/0254* (2013.01); *H04W 52/0293* (2013.01); *H04M 2250/12* (2013.01); *Y02B 60/50* (2013.01)

(58) Field of Classification Search
CPC ............................... G06F 3/017; G06F 1/3203
USPC ........................................................ 713/323
See application file for complete search history.

(56) References Cited

U.S. PATENT DOCUMENTS 5,167,024 A * 11/1992 Smith et al. .................. 713/322
6,834,249 B2 * 12/2004 Orchard ........................ 702/141
7,519,223 B2 * 4/2009 Dehlin et al. ................. 382/203
(Continued)

FOREIGN PATENT DOCUMENTS

CN       101015193 A    8/2007
CN       101040241 A    9/2007
(Continued)

OTHER PUBLICATIONS

W.E. Nagel et al. (Eds.): Euro-Par 2006, LNCS 4128, pp. 971-980, 2006. Springer-Verlag Berlin Heidelberg 2006.
(Continued)

*Primary Examiner* — Kim Huynh
*Assistant Examiner* — Eric Chang
(74) *Attorney, Agent, or Firm* — Jennifer M. Pascua

(57) ABSTRACT

In an embodiment, a mobile device includes a sensor processor system, an application processor system and a power management controller that controls power being applied to the application processor system. The sensor processor system monitors sensors connected to the mobile device. The sensor processor system detects a pre-defined gestures and an environmental condition or event based on the monitoring. The pre-defined gesture corresponds to one or more actions initiated by a user of the mobile device (e.g., the user jogs with the mobile device, places the mobile device in his/her pocket or backpack, etc.). The sensor processor system selects a power profile to be applied to the application processor system based on the detection, and instructs the power management controller to apply the selected power profile to the application processor system.

55 Claims, 10 Drawing Sheets

(56) References Cited

U.S. PATENT DOCUMENTS

| | | | |
|---|---|---|---|
| 7,633,076 B2* | 12/2009 | Huppi et al. | 250/559.36 |
| 7,881,902 B1* | 2/2011 | Kahn et al. | 702/160 |
| 2003/0142228 A1 | 7/2003 | Flach et al. | |
| 2003/0197597 A1 | 10/2003 | Bahl et al. | |
| 2004/0225904 A1 | 11/2004 | Perez et al. | |
| 2005/0066207 A1* | 3/2005 | Fleck et al. | 713/320 |
| 2006/0053311 A1 | 3/2006 | Chary | |
| 2007/0004451 A1* | 1/2007 | Anderson | 455/556.1 |
| 2007/0100480 A1 | 5/2007 | Sinclair et al. | |
| 2007/0176898 A1 | 8/2007 | Suh | |
| 2008/0218183 A1 | 9/2008 | Sato | |
| 2008/0235529 A1 | 9/2008 | Sugita | |
| 2009/0259865 A1 | 10/2009 | Sheynblat et al. | |

FOREIGN PATENT DOCUMENTS

| | | |
|---|---|---|
| CN | 101080057 A | 11/2007 |
| CN | 101222713 A | 7/2008 |
| EP | 1521438 | 4/2005 |
| EP | 2051157 A1 | 4/2009 |
| JP | 2008060815 A | 3/2008 |
| JP | 2008225648 A | 9/2008 |
| JP | 2008234475 A | 10/2008 |

OTHER PUBLICATIONS

International Search Report and Written Opinion—PCT/US2010/037488, International Search Authority—European Patent Office—Sep. 27, 2010.

Taiwan Search Report—TW099118417—TIPO—Feb. 17, 2013.

Taiwan Search Report—TW099118417—TIPO—Oct. 8, 2013.

\* cited by examiner

US 9,086,875 B2

CONTROLLING POWER CONSUMPTION OF A MOBILE DEVICE BASED ON GESTURE RECOGNITION

STATEMENT OF PRIORITY UNDER 35 U.S.C. §119

The present Application for Patent claims priority to Provisional Application No. 61/184,437, entitled "DEDICATED SENSORS CORE MICROCONTROLLER BASED ARCHITECTURE", filed Jun. 5, 2009, assigned to the assignee hereof and hereby expressly incorporated by reference herein in its entirety.

CROSS-REFERENCE TO RELATED APPLICATION

This application is related to co-pending U.S. application Ser. No. 12/101,930, entitled "POWER MANAGEMENT USING AT LEAST ONE OF A SPECIAL PROCESSOR AND MOTION SENSING", filed on Apr. 11, 2008, by Leonid Sheynblat and Thomas G. Wolf, assigned to the same assignee as the subject application and hereby incorporated by reference in its entirety.

BACKGROUND

1. Background Field

Embodiments are directed to power management of mobile devices, and more particularly to controlling power consumption of a mobile device based on gesture recognition.

2. Relevant Background

Battery life is an important criterion in mobile access terminals (e.g., cell phones, MP3 players, wireless mobile access terminals, non-wireless mobile access terminals, etc.). There are a number of different mechanisms in conventional access terminals for managing power consumption. Some access terminals enter a low-power mode, or sleep mode, when no applications are being executed. Other access terminals have more sophisticated power management mechanisms whereby the amount of power consumed scales with the processing load of the respective access terminal.

SUMMARY

In an embodiment, a mobile device includes a sensor processor system, an application processor system and a power management controller that controls power being applied to the application processor system. The sensor processor system monitors sensors connected to the mobile device. The sensor processor system detects a pre-defined gestures and an environmental condition or event based on the monitoring. The pre-defined gesture corresponds to one or more actions initiated by a user of the mobile device (e.g., the user jogs with the mobile device, places the mobile device in his/her pocket or backpack, etc.). The sensor processor system selects a power profile to be applied to the application processor system based on the detection, and instructs the power management controller to apply the selected power profile to the application processor system.

For example, a first embodiment is directed to a method of controlling power consumption of a mobile device, including monitoring, at a sensor processor system of the mobile device, one or more sensors connected to the mobile device, detecting one of a plurality of pre-defined gestures and one or more environmental conditions or events based on the monitoring, wherein each of the plurality of pre-defined gestures corresponds to one or more actions initiated by a user of the mobile device, selecting one of a plurality of power profiles to be applied to an application processor system based on the detecting and instructing a power management controller to apply the selected power profile to the application processor system.

In a further example of the first embodiment, the monitoring can be performed periodically by the sensor processor system. The one or more sensors can include (a) a light sensor, (b) a pressure sensor, (c) a gyroscopic sensor, (d) an accelerometer, (e) a touch-screen proximity sensor, (f) a fingerprint sensor and/or (g) a haptic sensor. The one or more user-initiated actions can include (a) the user pressing a key or button of the mobile device, (b) the user walking or jogging with the mobile device, (c) the user picking up the mobile device from a surface or storage location, (d) the user placing the mobile device onto a surface or into a storage location, (e) a proximity of the user's fingers being close to a display of the mobile device and/or (f) the user moving into an airplane with the mobile device. The one or more environmental conditions or events can include (a) an amount of light in proximity to the mobile device, (b) a temperature in proximity to the mobile device, (c) an acceleration of the mobile device, (d) a velocity of the mobile device, (e) an altitude of the mobile device and/or (f) identifying one or more wireless transmitters in range of the mobile device.

In a further example of the first embodiment, the selected power profile can establish (a) a clock frequency at which an application processor of the application processor system is to operate, (b) a current or voltage at which the application processor of the application processor system is to operate and/or (c) whether a modem subsystem configured to manage wireless communications to or from the mobile device is turned on or off. The mobile device can correspond to a wireless mobile device that includes a modem subsystem to manage wireless communications to or from the wireless mobile device.

The first embodiment may further include selecting one or more applications for execution by the application processor system based on the detecting, wherein the instructing step further instructs the application processor system to load the one or more applications, and wherein the selected power profile is configured to support power requirements of the one or more applications. The one or more applications includes an audio application and the selected power profile provides power for at least audio circuitry of the mobile device. The one or more applications can include a texting or email application and the selected power profile provides power for at least display circuitry of the mobile device. The one or more applications can include a wireless communications application and the selected power profile provides power for a modem subsystem of the mobile device. The selected power profile can be configured to provide a level of power that approximates a level of power required to support the one or more applications.

In a further example of the first embodiment, the first embodiment can further include, at the power management controller, determining that the application processor system has transitioned to a different mode of operation associated with a different power profile from among the plurality of power profiles, and applying the different power profile to the application processor system. The different mode of operation can correspond to a sleep-mode and the different power profile can correspond to a power profile associated with low-power requirements of the sleep-mode. The selected power profile can be associated with a first active mode and the different mode of operation can correspond to a second active mode, the first and second active modes having different power requirements for the application processor system that are each higher than a sleep-mode power requirement for the application processor system.

In another example, a second embodiment is directed to a mobile device, including an application processor system configured to execute one or more applications, a power management controller configured to control power consumption of the application processor system and a sensor processor system configured to monitor one or more sensors connected to the mobile device, to detect one of a plurality of pre-defined gestures and one or more environmental conditions or events based on the monitoring, to select one of a plurality of power profiles to be applied to the application processor system based on the detection, and to instruct the power management controller to apply the selected power profile to the application processor system, each of the plurality of pre-defined gestures corresponding to one or more actions initiated by a user of the mobile device.

In a further example of the second embodiment, the sensor processor system can monitor the one or more sensors on a periodic basis. The sensor processor system can continue to monitor the one or more sensors when the application processor system transitions to a sleep-state. The one or more sensors include (a) a light sensor, (b) a pressure sensor, (c) a gyroscopic sensor, (d) an accelerometer, (e) a touch-screen proximity sensor, (f) a fingerprint sensor and/or (g) a haptic sensor. The one or more user-initiated actions can include (a) the user pressing a key or button of the mobile device, (b) the user walking or jogging with the mobile device, (c) the user picking up the mobile device from a surface or storage location, (d) the user placing the mobile device onto a surface or into a storage location, (e) a proximity of the user's fingers being close to a display of the mobile device and/or (f) the user moving into an airplane with the mobile device. The one or more environmental conditions or events can include (a) an amount of light in proximity to the mobile device, (b) a temperature in proximity to the mobile device, (c) an acceleration of the mobile device, (d) a velocity of the mobile device, (e) an altitude of the mobile device and/or (f) identifying one or more wireless transmitters in range of the mobile device.

In a further example of the second embodiment, the selected power profile can establish (a) a clock frequency at which an application processor of the application processor system is to operate, (b) a current or voltage at which the application processor of the application processor system is to operate and/or (c) whether a modem subsystem configured to manage wireless communications to or from the mobile device is turned on or off. The mobile device can correspond to a wireless mobile device that includes a modem subsystem to manage wireless communications to or from the wireless mobile device. The sensor processor system can select one or more applications for execution by the application processor system based on the detection, the sensor processor system can instruct the application processor system to load the one or more applications, and the selected power profile can be configured to support power requirements of the one or more applications.

In a further example of the second embodiment, the one or more applications can include an audio application and the selected power profile provides power for audio circuitry of the mobile device. The one or more applications can include a texting or email application and the selected power profile provides power for display circuitry of the mobile device. The one or more applications can include a wireless communications application and the selected power profile provides power for a modem subsystem of the mobile device. The selected power profile can be configured to provide a level of power that approximates a level of power required to support the one or more applications. The power management controller can be configured to determine that the application processor system has transitioned to different mode of operation associated with a different power profile from among the plurality of power profiles, and to apply the different power profile to the application processor system. The different mode of operation can correspond to a sleep-mode and the different power profile can correspond to a power profile associated with low-power requirements of the sleep-mode. The selected power profile can be associated with a first active mode and the different mode of operation can correspond to a second active mode, the first and second active modes having different power requirements for the application processor system that are each higher than a sleep-mode power requirement for the application processor system.

In another example, a third embodiment is directed to a mobile device including means for monitoring, at a sensor processor system of the mobile device, one or more sensors connected to the mobile device, means for detecting one of a plurality of pre-defined gestures and one or more environmental conditions or events based on the monitoring, wherein each of the plurality of pre-defined gestures corresponds to one or more actions initiated by a user of the mobile device, and means for selecting one of a plurality of power profiles to be applied to an application processor system based on the detection and means for instructing a power management controller to apply the selected power profile to the application processor system.

In a further example of the third embodiment, the one or more sensors can include (a) a light sensor, (b) a pressure sensor, (c) a gyroscopic sensor, (d) an accelerometer, (e) a touch-screen proximity sensor, (f) a fingerprint sensor and/or (g) a haptic sensor. The one or more user-initiated actions can include (a) the user pressing a key or button of the mobile device, (b) the user walking or jogging with the mobile device, (c) the user picking up the mobile device from a surface or storage location, (d) the user placing the mobile device onto a surface or into a storage location, (e) a proximity of the user's fingers being close to a display of the mobile device and/or (f) the user moving into an airplane with the mobile device. The one or more environmental conditions or events can include (a) an amount of light in proximity to the mobile device, (b) a temperature in proximity to the mobile device, (c) an acceleration of the mobile device, (d) a velocity of the mobile device, (e) an altitude of the mobile device and/or (f) identifying one or more wireless transmitters in range of the mobile device.

In a further example of the third embodiment, the selected power profile can establish (a) a clock frequency at which an application processor of the application processor system is to operate, (b) a current or voltage at which the application processor of the application processor system is to operate and/or (c) whether a modem subsystem configured to manage wireless communications to or from the mobile device is turned on or off. The mobile device can further include means for selecting one or more applications for execution by the application processor system based on the detection, wherein the means for instructing further instructs the application processor system to load the one or more applications, and wherein the selected power profile is configured to support power requirements of the one or more applications. Also, the mobile device can further include means for determining that the application processor system has transitioned to different mode of operation associated with a different power profile from among the plurality of power profiles and means for applying the different power profile to the application processor system.

In another example, a fourth embodiment is directed to a mobile device, including logic configured to monitor, at a sensor processor system of the mobile device, one or more sensors connected to the mobile device, logic configured to detect one of a plurality of pre-defined gestures and one or more environmental conditions or events based on the monitoring, wherein each of the plurality of pre-defined gestures corresponds to one or more actions initiated by a user of the mobile device, logic configured to select one of a plurality of power profiles to be applied to an application processor system based on the detection and logic configured to instruct a power management controller to apply the selected power profile to the application processor system.

In a further example of the fourth embodiment, the one or more sensors can include (a) a light sensor, (b) a pressure sensor, (c) a gyroscopic sensor, (d) an accelerometer, (e) a touch-screen proximity sensor, (f) a fingerprint sensor and/or (g) a haptic sensor. The one or more user-initiated actions can include (a) the user pressing a key or button of the mobile device, (b) the user walking or jogging with the mobile device, (c) the user picking up the mobile device from a surface or storage location, (d) the user placing the mobile device onto a surface or into a storage location, (e) a proximity of the user's fingers being close to a display of the mobile device and/or (f) the user moving into an airplane with the mobile device. The one or more environmental conditions or events can include (a) an amount of light in proximity to the mobile device, (b) a temperature in proximity to the mobile device, (c) an acceleration of the mobile device, (d) a velocity of the mobile device, (e) an altitude of the mobile device and/or (f) identifying one or more wireless transmitters in range of the mobile device. The selected power profile can establish (a) a clock frequency at which an application processor of the application processor system is to operate, (b) a current or voltage at which the application processor of the application processor system is to operate and/or (c) whether a modem subsystem configured to manage wireless communications to or from the mobile device is turned on or off.

In a further example of the fourth embodiment, the mobile device can further include logic configured to select one or more applications for execution by the application processor system based on the detection, wherein the logic configured to instruct further instructs the application processor system to load the one or more applications, and wherein the selected power profile is configured to support power requirements of the one or more applications. Also, the mobile device can further include logic configured to determine that the application processor system has transitioned to different mode of operation associated with a different power profile from among the plurality of power profiles and logic configured to apply the different power profile to the application processor system.

In another example, a fifth embodiment is directed to a non-transitory computer-readable storage medium containing instructions stored thereon, which, when executed by a mobile device, cause the mobile device to perform operations, the instructions including program code to monitor, at a sensor processor system of the mobile device, one or more sensors connected to the mobile device, program code to detect one of a plurality of pre-defined gestures and one or more environmental conditions or events based on the monitoring, wherein each of the plurality of pre-defined gestures corresponds to one or more actions initiated by a user of the mobile device, program code to select one of a plurality of power profiles to be applied to an application processor system based on the detection and program code to instruct a power management controller to apply the selected power profile to the application processor system.

In a further example of the fifth embodiment, the one or more sensors can include (a) a light sensor, (b) a pressure sensor, (c) a gyroscopic sensor, (d) an accelerometer, (e) a touch-screen proximity sensor, (f) a fingerprint sensor and/or (g) a haptic sensor. The one or more user-initiated actions can include (a) the user pressing a key or button of the mobile device, (b) the user walking or jogging with the mobile device, (c) the user picking up the mobile device from a surface or storage location, (d) the user placing the mobile device onto a surface or into a storage location, (e) a proximity of the user's fingers being close to a display of the mobile device and/or (f) the user moving into an airplane with the mobile device. The one or more environmental conditions or events can include (a) an amount of light in proximity to the mobile device, (b) a temperature in proximity to the mobile device, (c) an acceleration of the mobile device, (d) a velocity of the mobile device, (e) an altitude of the mobile device and/or (f) identifying one or more wireless transmitters in range of the mobile device. The selected power profile can establish (a) a clock frequency at which an application processor of the application processor system is to operate, (b) a current or voltage at which the application processor of the application processor system is to operate and/or (c) whether a modem subsystem configured to manage wireless communications to or from the mobile device is turned on or off.

In a further example of the fifth embodiment, the non-transitory computer-readable storage medium can further include program code to select one or more applications for execution by the application processor system based on the detection, wherein the program code to instruct further instructs the application processor system to load the one or more applications, and wherein the selected power profile is configured to support power requirements of the one or more applications. Also, the non-transitory computer-readable storage medium can further include program code to determine that the application processor system has transitioned to different mode of operation associated with a different power profile from among the plurality of power profiles, and program code to apply the different power profile to the application processor system.

DETAILED DESCRIPTION

Figure 1:
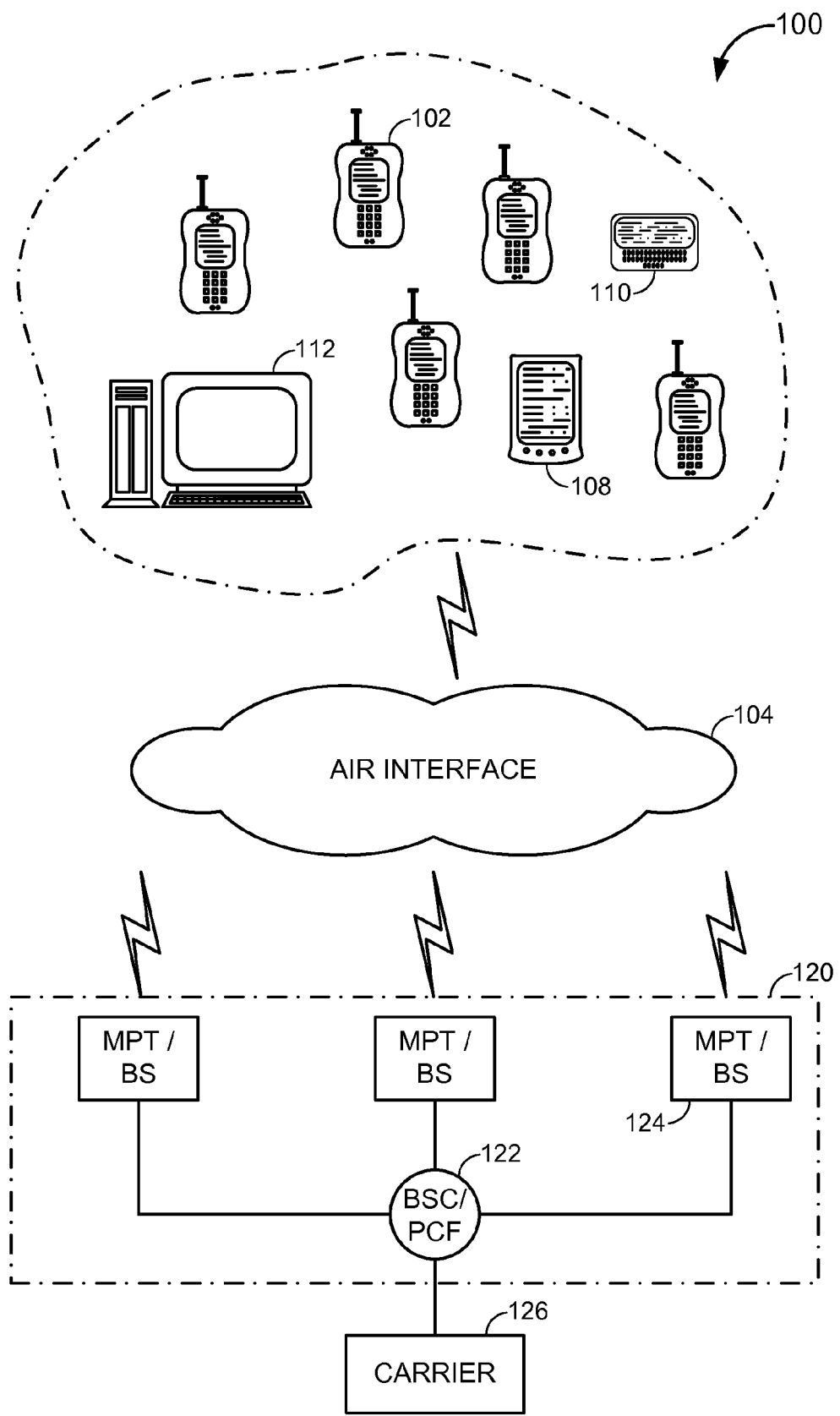
FIG. 1 is a diagram of a wireless network architecture that supports access terminals and access networks in accordance with at least one embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
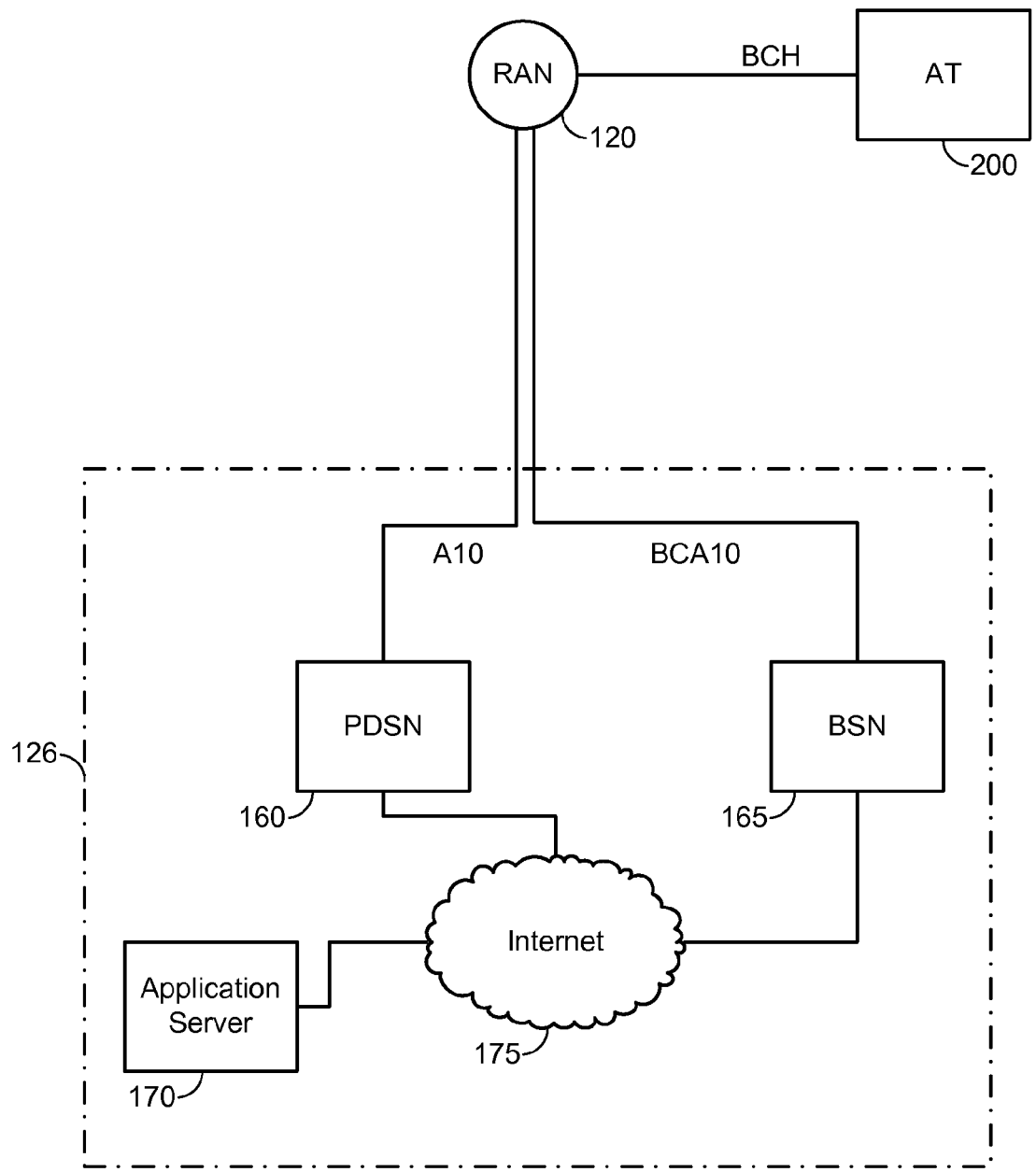
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
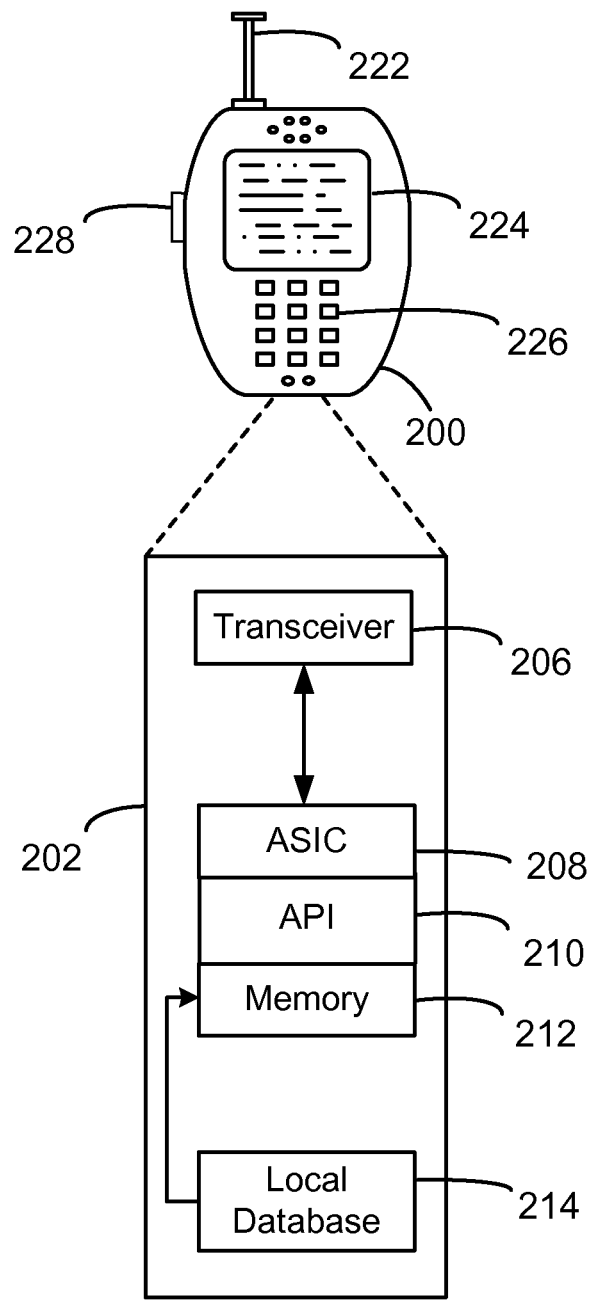
FIG. 3 is an illustration of an access terminal in accordance with at least one embodiment.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Accordingly, the access terminal 200 of FIG. 2 corresponds to a mobile station whereby a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

As discussed in the Background section, battery life is an important criterion in mobile access terminals (e.g., cell phones, MP3 players, wireless mobile access terminals, non-wireless mobile access terminals, etc.). There are a number of different mechanisms in conventional access terminals for managing power consumption. Some access terminals enter a low-power mode, or sleep mode, when no applications are being executed. Other access terminals have more sophisticated power management mechanisms whereby the amount of power consumed scales with the processing load of the respective access terminal.

For example, assume that a conventional access terminal is in sleep mode, and that the access terminal then determines to exit sleep mode. This determination can be made, for example, when a user of the access terminal presses a button on the access terminal. As the access terminal exits sleep mode, hardware on the access terminal (e.g., a modem, application processor, etc.) is powered-up and the user of the access terminal is typically presented with some type of menu or home-screen. Assume the user is powering-up the access terminal to load play music. Accordingly, from the home-screen of the access terminal, the user navigates to an option for launching an MP3 player, selects the option and then the MP3 player is loaded on the access terminal.

As will be appreciated, the above-described process is relatively slow because the user is expected to navigate to the desired application or API for execution from the access terminal's home screen. Also, the above-described process can potentially consume more power than strictly necessary because the display of the access terminal is likely to have been powered-up, hardware not required for executing the MP3 API and outputting music may have been powered-up and the primary, high-powered processor is turned on for a period of time before the user's desired functions are determined.

Embodiments of the invention are thereby directed to selectively controlling power applied to a primary application processing system as well as selectively loading and/or shutting down APIs of the primary application processing system based on recognition that the user of the access terminal has performed one of a plurality of pre-defined gestures and/or based on one or more environmental conditions or events. As used herein, a 'gesture' corresponds to a set of one or more direct user actions that are detectable by the access terminals. As will be discussed below, the gesture-detection can itself be based in part on environmental conditions, such as ambient light decreasing which is used to corroborate a gesture corresponding to the user placing a mobile device in his/her pocket or backpack.

For example, a gesture can correspond to the user having the access terminal in his/her pocket when walking, jogging, driving, etc., or the gesture can be shaking the access terminal, moving the access terminal in a particular manner and so on. For example, the user can move the access terminal to a different altitude, can move the access terminal with a given amount of acceleration or velocity, and so on. Also, the gestures can be corroborated by non-user actions and/or conditions. In other words, certain actions and/or conditions outside of the user's direct influence can ease the detection of the user's direct action that corresponds to the gesture. For example, if a gesture is mapped to an action such sending a signal to an oven to begin a pre-heat operation so the user can begin making dinner, then the gesture can be more confidently detected if the access terminal thinks it is located at the user's home (e.g., based on a local connection such as Bluetooth, based on GPS, based on a current serving base station, etc.). Thus, environmental conditions or other non-user actions or conditions can aid in the gesture recognition process, and can either be considered part of the gesture itself or can be considered to be a separate consideration used to corroborate or verify the gesture. In another example, the environmental condition or event can correspond to a change in humidity, altitude, ambient light or temperature, an antenna receiving a certain signal, detecting that the access terminal is in range of a particular wireless transmitter (e.g., a base station, router, GPS station, access point, etc.), etc. Accordingly, a gesture may be initially recognized using sensor input and then further corroborated via environmental conditions or events.

These gestures and/or environmental conditions are monitored by a sensor processor system, which operates independently from the application processor system that executes the APIs. Each pre-defined gesture is mapped to a set of APIs (or one or more applications or routines associated with the set of APIs) configured for execution by the application processor system and/or the modem subsystem, and each pre-defined gesture is also mapped to one of a plurality of power profiles for the application processor system and/or the modem subsystem. In an embodiment of the invention, the above-described power profiles can be stored in external memory and loaded when required at the direction of the power management controller the power profile selection is determined by the gesture engine output. For instance a gesture is detected and the user has already defined this gesture to start the MP3 player. The power profile for the MP3 player will be selected by the power manager based on a command sent to the power management subsystem from the sensor processor (gesture detection engine). Alternatively, the above-described power profiles can be stored in internal memory (e.g., flash memory) that is accessible to the power management controller. Thus, upon detecting a particular gesture, the sensor processor system sends instructions for transitioning the application processing system and/or the modem subsystem 438A to the associated power profile. In an example, the instructions for transitioning the application processing system to the associated power profile can include instructions for modifying the manner in which the set of APIs are executed (e.g., instructions to shut-down, start-up or otherwise modify execution for one or more of the set of APIs). In another example, the instructions for transitioning the modem subsystem portion of the application processing system to the associated power profile can include instructions for modifying the size of a frequency search for the modem subsystem (e.g., reduce the frequency range being searched if the access terminal is expected to be out of service, etc.). The sensor processor system is configured to consume a much lower amount of power than the application processor system and/or the modem subsystem, such that overall power consumption of the access terminal can be reduced.

Figure 4A:
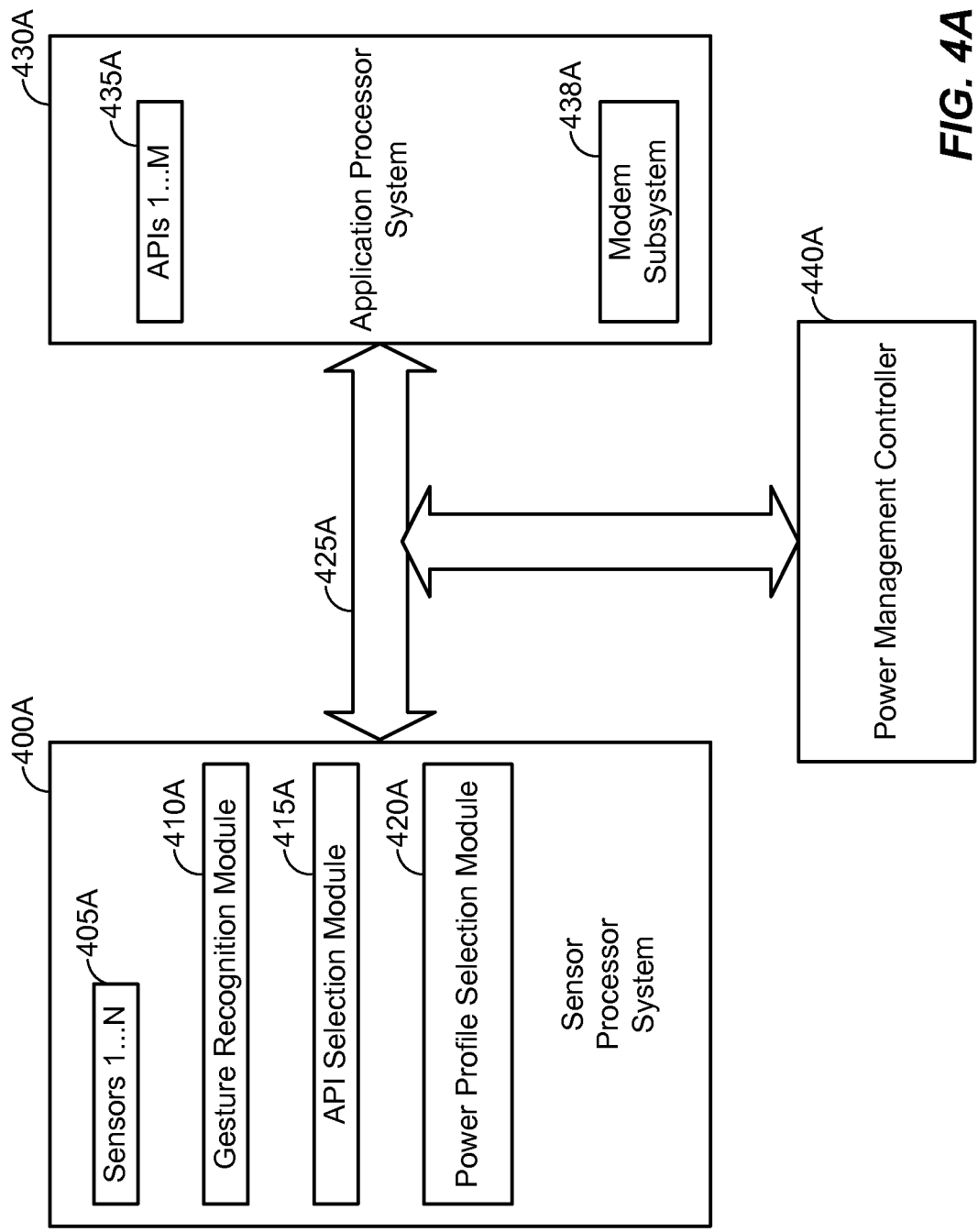
FIG. 4A illustrates a high-level diagram of the architecture of an access terminal in accordance with an embodiment.

FIG. 4A illustrates a high-level diagram of the architecture of an access terminal in accordance with an embodiment of the invention. Referring to FIG. 4A, the access terminal includes a sensor processor system 400A, an application processor system 430A and a power management controller 440A. The sensor processor system 400A includes a plurality of sensors 1 ... N, 405A, a gesture recognition module 410A, an API selection module 415A and a power profile selection module 420A. While not shown explicitly in FIG. 4A, the sensor processor system has a sensor processor that is configured for low-power operation, and consumes significantly less power than an application processor of the application processor system. The sensor processor interacts (e.g., receives sensor data) from sensors 1 ... N, 405A, and executes the modules 410A, 415A and 420A.

The sensor processor system 400A can be maintained in an 'on' state even when the application processor system is in a sleep state, with the gesture recognition module being executed continuously in order to detect when a pre-defined gesture occurs. However, the sensor processor system 400A can have one or more low-power modes. For example, in one low-power mode, the sensor processor of the sensor processor system 400A can be in a dormant state but can be configured to wake-up when an interrupt from one of the sensors 405A is received. For example, most of the sensors 405A can be powered down in the dormant state for the sensor processor system 400A, but one or more sensors (e.g., such as an accelerometer) can remain active to provide interrupts for waking up the sensor processor system 400A. The sensor processor system 400A can also be placed in duty cycle mode such that the sensor processor system 400A will periodically wake up to check one or more of sensors 405A. Thus, while the sensor processor system 400A is maintained in an 'on'-state, this is not intended to imply that each of sensors 405A are used constantly and/or that the sensor process is active continuously, but rather that the sensor processor system 400A will be capable of detecting a pre-defined gesture in a timely fashion and will not be shut down altogether. The sensor processor system 400A is connected to both the application processor system 430A and/or modem subsystem 438A and the power management controller 440A via a connection 425A, which can be a single bus, multiple buses and/or other types of connection pathways.

Generally, APIs are executed by the application processor system 430A, with the sensor processor system 400A configured to monitor for the pre-defined gestures and then take appropriate action. However, it is also possible one or more APIs could be offloaded from the application processor system 430A to the sensor processor system 400A. For example, APIs that do not require a high amount of processing resources could be offloaded to the sensor processor system 400A, which will generally have a slower, lower-power processor than the application processor system 430A. In another example, sensor-specific APIs (e.g., a pedometer API that counts the steps of the user when walking/jogging, etc.) could be offloaded to the sensor processor system 400A since the sensor processor system 400A is already monitoring sensors 1 ... N.

The application processor system 430A includes the hardware and/or software associated with executing APIs on the access terminal, and can also include hardware and/or software related to wireless communications (e.g. modem hardware, an antenna, etc.) if the access terminal is configured for wireless connectivity. Accordingly, the application processor system 430A is shown in FIG. 4A as including a modem subsystem 438A, which corresponds to the software and/or hardware related to wireless connectivity for the access terminal. In an embodiment, the modem subsystem 430A can optionally be omitted from the access terminal if the access terminal is not configured for wireless communications. As shown in FIG. 4A, in an active state, the application processor system 430A is configured to execute one or more APIs 1 ... M, 435A.

The power management controller 440A controls the power consumption of the application processor system 430A and/or the modem subsystem 438A. For example, the power management controller 440A can selectively turn on or off specific hardware of the application processor system 430A, such as the modem hardware. The power management controller 440A can also scale the power consumption of specific hardware in the application processor system 430A either up or down. For example, the voltage applied to the application processor can be increased or decreased to manage the power consumption of the application processor system 430A Also, the clock signal applied to hardware in the application processor system 430A can be increased or decreased to control the speed of execution of the application processor system 430A, which in turn controls its power consumption.

The power management controller 440A manages the power consumption of the application processor system 430A in accordance with a power profile selected by the power profile selection module 420A of the sensor processor system 400A and then conveyed to the power management controller 440A via the connection 425A. However, the power management controller 440A can also override the selected power profile from the sensor processor system, such as when the application processor system 430A informs the power management controller 440A that its power requirements have changed (e.g., a user has requested a shut down or loading of one or more APIs through the application processor system 430A, etc.).

Figure 4B:
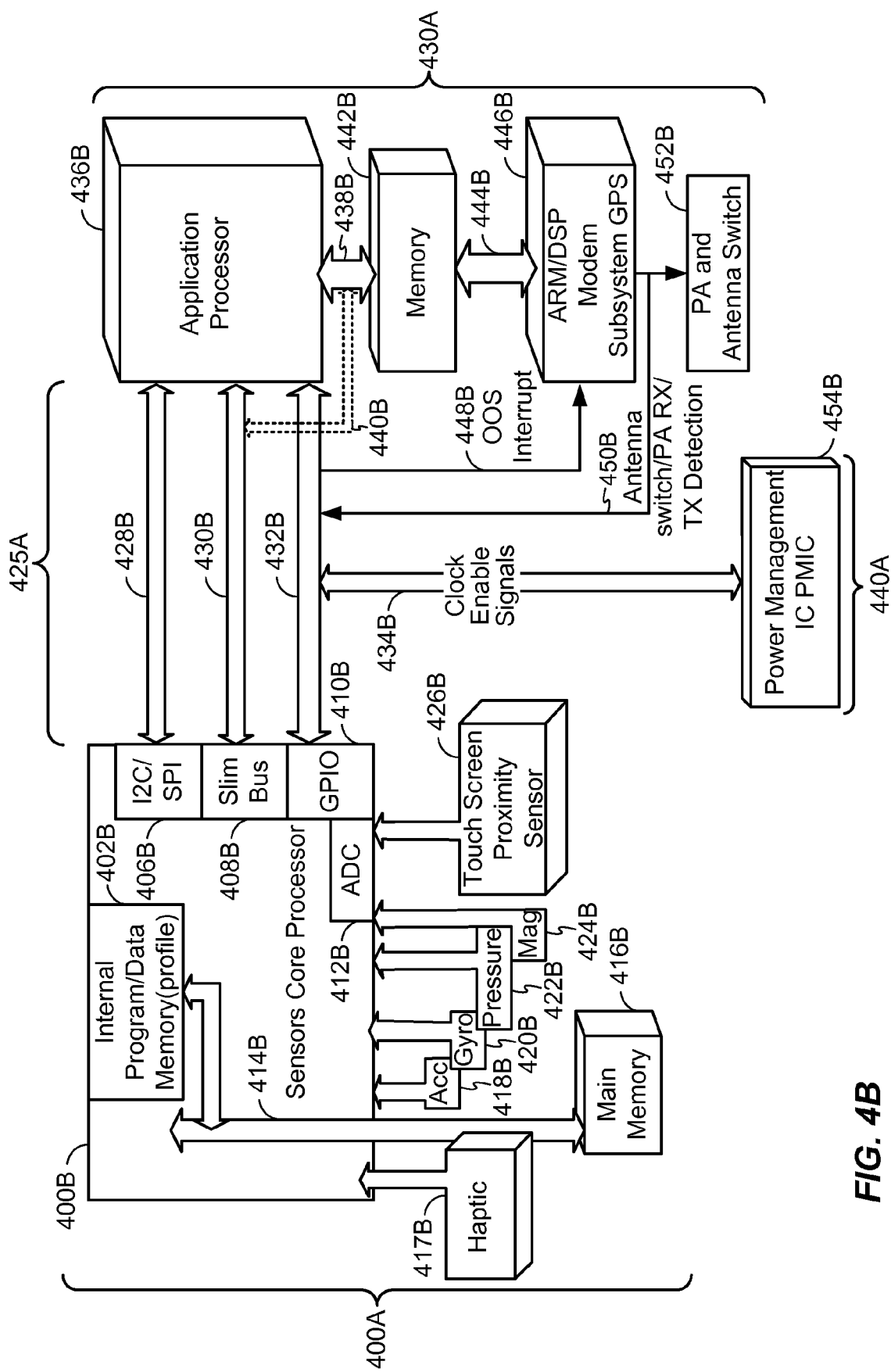
FIG. 4B illustrates one specific example of the architecture described above with respect to FIG. 4A.

FIG. 4B illustrates one specific example of the architecture described above with respect to FIG. 4A. Referring to FIG. 4B, a sensor core processor 400B includes a memory 402B (e.g., including an internal data memory and an internal program memory), an Inter Integrated Circuit Bus (I2C) 406B, a Serial to Peripheral Interface (SPI) 408B, General Purpose Input Output Pins (GPIO) 410B, an analog to digital conversion (ADC) unit 412B. The memory 402B is connected via a bus 414B to a main memory 416B that is separate from the sensor core processor 400B. The sensor core processor 400B is connected to a plurality of sensors, including a haptic driver or actuator 417B, an accelerometer 418B, a gyroscopic sensor 420B, a pressure sensor 422B, a magnetic sensor 424B and a touch-screen proximity sensor Light Sensor 426B, a finger print sensor (not shown). As will be appreciated, the sensor core processor 400B can interact with, or receive sensor data from, each of sensors 418B through 426B without having to power-up an application processor 436B. Collectively, elements 400B through 426B of FIG. 4B correspond to the sensor processor system 400A of FIG. 4A, with sensors 1 ... N, 405A, of FIG. 4A corresponding to the sensors 418B through 426B of FIG. 4B and the modules 410A, 415A and 420A corresponding to the hardware and/or software configured to evaluate the data from sensors 418B through 426B.

The I2C 406B connects to the application processor 436B via a bus 428B, the SPI 408B connects to the application processor 436B via a bus 430B and the GPIO 410B connects to the application processor 436B via a bus 432B. In FIG. 4A, the SPI 408B is shown as corresponding to a Slimbus. The bus 432B is itself connected to a bus 434B to a power management integrated circuit (PMIC) 454B. In an example, in the direction from the PMIC 454B to the application processor 436B, the bus 434B can carry clock enable signals that are used to control hardware on the application processor 436B. The PMIC 454B can also apply dynamic voltage and frequency scaling controls to the application processor 436B and/or the modem subsystem 446B. Collectively, elements buses 428B, 430B, 432B and 434B are included in the connection 425A of FIG. 4A, and the PMIC 454B corresponds to the power management controller 440A of FIG. 4A.

In the embodiment of FIG. 4B, the application processor 436B is illustrated as an ARM11/Scorpio processor, although it will be appreciated that the application processor 436B can correspond to a different type of processor in other embodiments of the invention. The application processor 436B connects to a memory 442B via a bus 438B. The memory 442B is connected to a modem subsystem via bus 444B. In an example, the modem subsystem 446B corresponds to an ARM/DSP processor and can include Global Positioning System (GPS) functionality, although the modem system 446B could be configured differently in other embodiments of the invention.

Referring to FIG. 4B, the modem subsystem 446B is connected to a power amplifier (PA) and antenna switch 452B via a bus 450B, which is also connected to the bus 432B. In an example, the bus 450B can be used to carry signaling related to antenna switch/PA reception/transmission (RX/TX) detection). Accordingly, in this sense, the PA and antenna switch 452B can be considered to be a sensor among sensors 1 ... N, 405A, of the sensor processor system 400A of FIG. 4A, in an example.

The elements 436B, 442B, 446B and 452B of FIG. 4B collectively corresponds to the application processor system 430A of FIG. 4A. Thus, it will be appreciated that the PMIC 454B can separately connect to each hardware element of the application processor system 430A for controlling the power consumption of each hardware element independently. In other words, the PMIC 454B can connect to the application processor 436B via buses 434B and 432B, the PMIC 454B can connect to the modem subsystem via buses 434B, 432B and 448B, and so on.

Figure 5A:
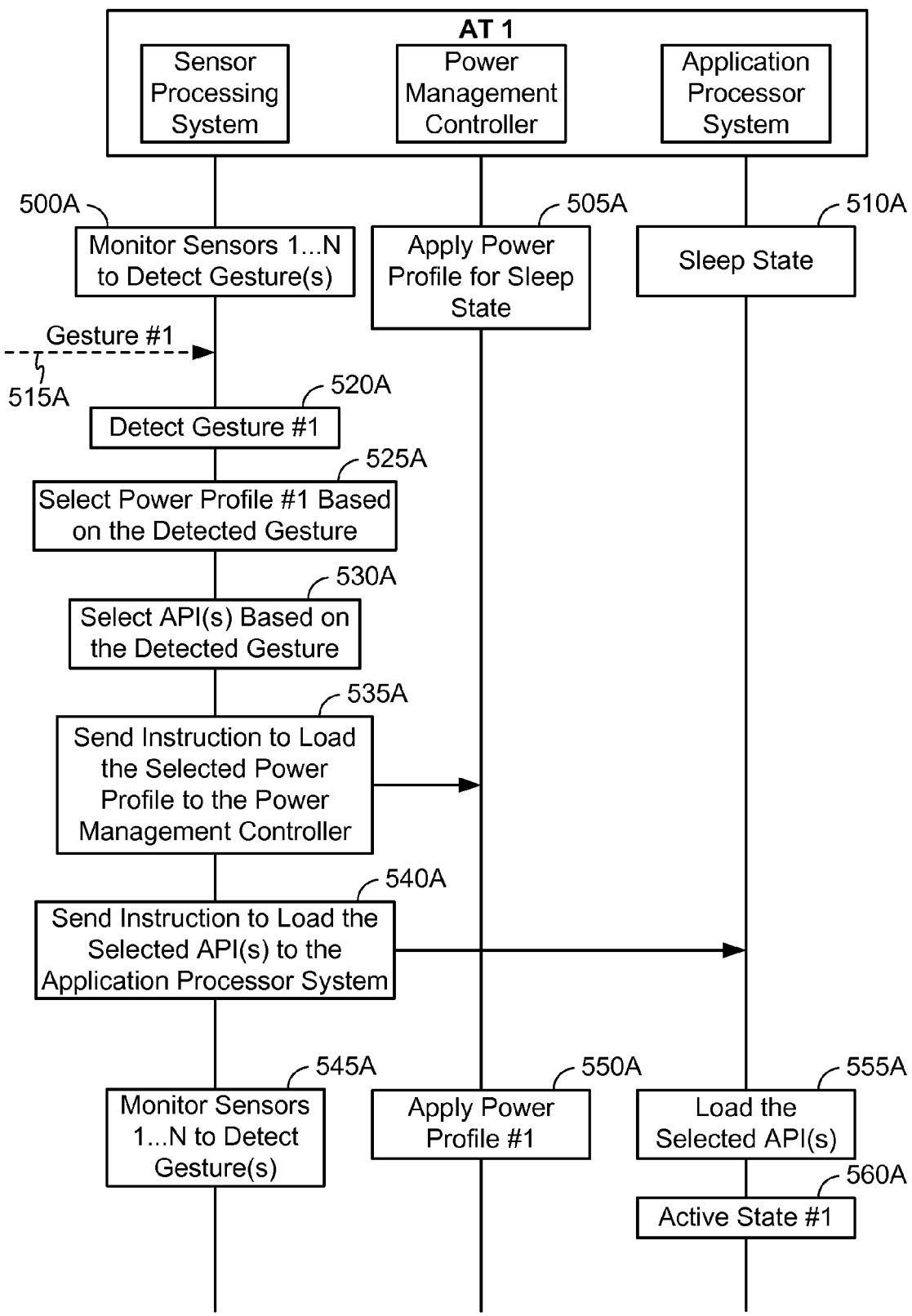
FIG. 5A illustrates a gesture-based power control process of the application processor system of FIG. 4A in accordance with an embodiment.

FIG. 5A illustrates a gesture-based power control process of the application processor system 430A of FIG. 4A in accordance with an embodiment of the invention. Referring to FIG. 5A, assume that the sensor processor system 400A is monitoring sensors 1 . . . N in order to detect gestures by executing the gesture recognition module 410A and evaluating sensor data from sensors 1 . . . N using the gesture recognition module 410A, 500A. Further assume that the power management controller 440A is applying a power profile configured for a sleep-state or low-power state of the application processor system 430A, 505A, and that the application processor system 430A is operating in a sleep-state, 510A. While in sleep-state, the application processor 430A is generally not executing routines associated with any APIs, although the modem subsystem of the application processor system 430A may still periodically wake-up to check for pages of AT 1 and/or perform other background tasks that occur periodically when in sleep-state.

In 515A, assume that a user of AT 1 gestures AT 1 ("Gesture #1") in a manner consistent with one of a plurality of pre-defined gestures known to the gesture recognition module 410A of FIG. 4A. As will be described in greater detail below, the gesture of 515A can correspond to any number of environmental conditions, such as the user shaking AT 1 in a particular manner, a voice-command of the user, etc. One or more of sensors 1 . . . N detect a change to AT 1's environment from the gesture of 515A, and at least the one or more sensors report sensor data to the gesture recognition module 410A, which then detects or identifies the gesture from 515A based on the reported sensor data, 520A. Thus, the environmental conditions or events monitored by the sensors are used to detect the gesture from 515A. In an example, the sensors 1 . . . N can simply all report on a continuous or periodic basis, or alternatively reports from the sensors 1 . . . N can be event-triggered such that sensor data is only sent to the gesture recognition module 410A when a potential gesture is detected.

Examples of gestures and gesture-recognition will now be described in more detail before turning back to the process of FIG. 5A. Examples of gestures and the types of sensors that can be used to detect the gestures are provided below in Table 1:

TABLE 1

Examples of Gestures

| Gesture | Gesture Description | Sensor(s) Used to Detect Environmental Conditions/Events Indicative of Gesture |
|---|---|---|
| A | User of AT 1 presses a key/button. | Haptic Actuator |
| B | Walking/Jogging while carrying AT 1. | Accelerometer; gyroscope; and/or magnetometer pressure sensors |
| C | User of AT 1 picks up AT 1 from surface. | Accelerometer; Gyroscopic sensor; and/or magnetometer |
| D | User of AT 1 picks up AT 1 from surface and then places AT 1 in his/her pocket | Accelerometer; Gyroscopic sensor; and/or light sensor |
| E | User places AT 1 in his/her backpack | Accelerometer; Gyroscopic sensor; and/or light sensor |
| F | Phone has not moved since last reported Out of Service (modem/GPS) | Modem subsystem; and/or Accelerometer |
| G | User's fingers are in proximity of a display of AT 1 but have no actually touched the display. | Capacitive; and/or Magnetic Sensor |
| H | User enters airplane with AT 1 (e.g., gesture detection engine/algorithm will sample accelerometer and can use barometric sensors to detect that the phone is in an airplane). | Accelerometer; and/or barometric sensor |
| I | Complex gestures pre recorded by a user. These gestures are saved in a gesture database and are linked to event(s) based on the users settings. | Accelerometer; Gyroscope; magnetometer; and/or pressure |
| J | Change in Environmental Conditions (Non-User initiated) | Accelerometer; Gyroscope; magnetometer; light sensor; temperature sensor; and/or pressure sensor |

In an example, referring to Table 1 (above), each gesture can be pre-defined, such that the gesture recognition module 410A can evaluate sensor data from the relevant sensors and compare this sensor data with one or more pre-defined sensor data parameters for the gesture. The one or more pre-defined sensor data parameters can correspond to ranges of sensor data that will satisfy the definition for a particular gesture. Also, the one or more pre-defined sensor data parameters can include parameters for a single sensor, or alternatively parameters for multiple sensors. In a gesture is associated with pre-defined parameters for multiple sensors, it will be appreciated that (i) any of the sensors reporting sensor data consistent with its parameter(s) can result in gesture-recognition by the gesture recognition module 410A, or (ii) alternatively that each of the multiple sensors reporting sensor data consistent with its respective parameter(s) can result in gesture-recognition by the gesture recognition module 410A.

Turning back to FIG. 5A, after detecting the gesture in 520A, the gesture recognition module 410A launches the power profile selection module 420A in order to select one of a plurality of power profiles that is associated with the identified, pre-defined gesture, 525A, and the gesture recognition module 410A also launches the API selection module to select API(s) that are associated with the identified, pre-defined gesture, 530A. In an example, while described as separate modules, the modules 410A, 415A and 420A can correspond to a single software application executed by the sensor processor system 400A.

As will be appreciated, the API selection module 415A and power profile selection module 420A can map the identified gesture from 520A to a predetermined or preset API-instruction and power profile, respectively, to be conveyed to the application processor system 430A and power management controller 440A, respectively. For example, based on the gestures listed in Table 1 (above), the API selection module 415A can use a gesture-to-API table as follows:

TABLE 2

Examples of APIs that are mapped to particular gestures

| Gesture | Gesture Description | API(s) Associated with Gesture |
|---|---|---|
| A | User of AT 1 presses a key/button. | MP3 Player; haptic feedback. |
| B | Walking/Jogging while carrying AT 1. | Pedometer Application; MP3 Player; and/or GPS Tracking Application |
| C | User of AT 1 picks up AT 1 from surface or from holster. | Phone Application; Texting Application; Email Application |
| D | User of AT 1 picks up AT 1 from surface and then places AT 1 in his/her pocket | None (Sleep-state) |
| E | User places AT 1 in his/her backpack | None (Sleep-state) |
| F | Phone has not moved since last reported Out of Service (modem/GPS) | None (Sleep-state) |
| G | User's fingers are in proximity of a display of AT 1 but have no actually touched the display. | None (Sleep-state) |
| H | User enters airplane with AT 1 | Keep current API(s) but shut down APIs associated with modem subsystem |
| I | User is using fidgeting with his/her phone but no action is needed. | None (Sleep-state) |

In another example, based on the gestures listed in Table 1 (above), the power profile selection module can use a gesture-to-power-profile table as follows:

TABLE 3

Examples of APIs that are mapped to particular power profiles

| Gesture | Gesture Description | Power Profile |
|---|---|---|
| A | User of AT 1 presses a key/button. | Power Profile #A |
| B | Walking/Jogging while carrying AT 1. | Power Profile #B |
| C | User of AT 1 picks up AT 1 from surface. | Power Profile #C |
| D | User of AT 1 picks up AT 1 from surface and then places AT 1 in his/her pocket | Power Profile #D |
| E | User places AT 1 in his/her backpack | Sleep-State Power Profile |
| F | Phone has not moved since last reported Out of Service (modem/GPS) | Sleep-State Power Profile |
| G | User's fingers are in proximity of a display of AT 1 but have no actually touched the display. | Sleep-State Power Profile |
| H | User enters airplane with AT 1 | Power Profile #E |
| I | User is fidgeting with his/her phone | Sleep-State Power Profile |

Examples of the modem subsystem and application-processor voltage settings for the power-profiles listed in Table 3 may be as follows, in one example:

TABLE 4

Power Profile examples

| Power Profile # | Examples of Possible Power Profile Details |
|---|---|
| Sleep State | Application Processor Frequency: 0 MHz<br>Application Processor Voltage: 0 V<br>Modem subsystem: Off |
| A | Application Processor Frequency: 1000 MHz<br>Application Processor Voltage: 1.3 V<br>Modem subsystem: On |
| B | Application Processor Frequency: 600 MHz<br>Application Processor Voltage: 1.1 V<br>Modem subsystem: On |
| C | Application Processor Frequency: 400 MHz<br>Application Processor Voltage: 0.9 V<br>Modem subsystem: On |
| D | Application Processor Frequency: 600 MHz<br>Application Processor Voltage: 1 V<br>Modem subsystem: On |
| E | Application Processor Frequency: 400 MHz<br>Application Processor Voltage: 0.9 V<br>Modem subsystem: Off |

While the power profiles listed in Table 4 include a very small set of adjustable power profile settings for the application processor system 430A, it will be appreciated that different groups of power profile settings could be associated with power profiles in accordance with other embodiments of the invention Turning back to FIG. 5A, after making the power profile and API selections in 525A and 530A, the sensor processor system 400A sends an instruction to the power management controller 440A via the connection 425A that requests the power management controller 440A to load or implement the selected power profile, 535A, and the sensor processor system 400A also sends an instruction to the application processor system 430A via the connection 425A that requests the application processor system 430A to exit sleep-state and to load (or shut down) the selected API(s) (or applications/routines associated with the APIs), 540A.

After sending the instructions in 535A and 540A the sensor processor system 400A resumes its monitoring of sensors 1 . . . N in order to detect any subsequent gestures, 545A. Upon receiving the instruction from 535A, the power management controller 440A applies the selected power profile ("power profile #1") to the application processor system 430A, 550A. Upon receiving the instruction from 540A, the application processor system 430A loads the selected API(s), 555A, and enters an active state ("active state #1").

Figure 5B:
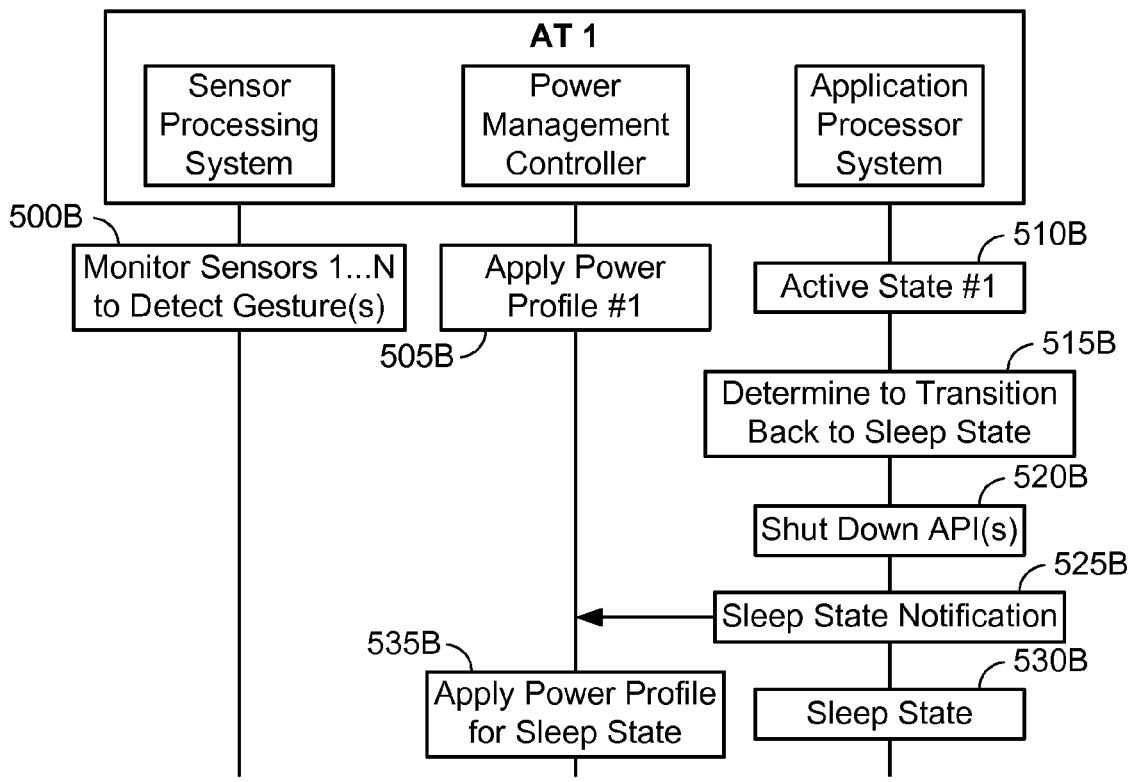
FIG. 5B illustrates a continuation of the process of FIG. 5A in accordance with an embodiment.

FIG. 5B illustrates a continuation of the process of FIG. 5A in accordance with an embodiment of the invention. Referring to FIG. 5B, assume that the process of FIG. 5A has executed, after which the sensor processor system 400A continues monitoring sensors 1 . . . N in order to detect gestures, 500B, the power management controller 440A is applying power profile #1 for powering the application processor system 430A, 505B, and the application processor system 430A is operating in active state #1, 510B, which means API(s) associated with active state #1 are being executed by the application processor system 430A.

Next, at some later point in time, the application processor system 430A determines to transition itself back to sleep-mode, 515B. In the example of FIG. 5B, the determination of 515B is not based on a gesture detected by the sensor processor system 400A, but rather by the application processor system 430A itself. For example, the application processor system 430A may have completed execution of a user-requested task and no longer requires execution of any APIs, resulting in the determination of 515B. In 520B, if necessary, the application processor system 430A shuts down any APIs that were executing during its active state #1 operation. The application processor system 430A also sends a sleep-mode notification to the power management controller 430A to request that the power management controller 440A supply power in accordance with sleep-state or sleep-mode as opposed to actives state #1, 525B.

While 525B is shown as occurring after 520B in FIG. 5B, it will be appreciated that the order of these operations can be switched in other embodiments, such that the sleep state notification is sent before the application processor system 430A shuts down its APIs in preparation for the sleep-state. Accordingly, the application processor 430A enters sleep state in 530B, and the power management controller 440B applies a power profile for sleep-state operation, 535B, as in 505A of FIG. 5A.

Figure 5C:
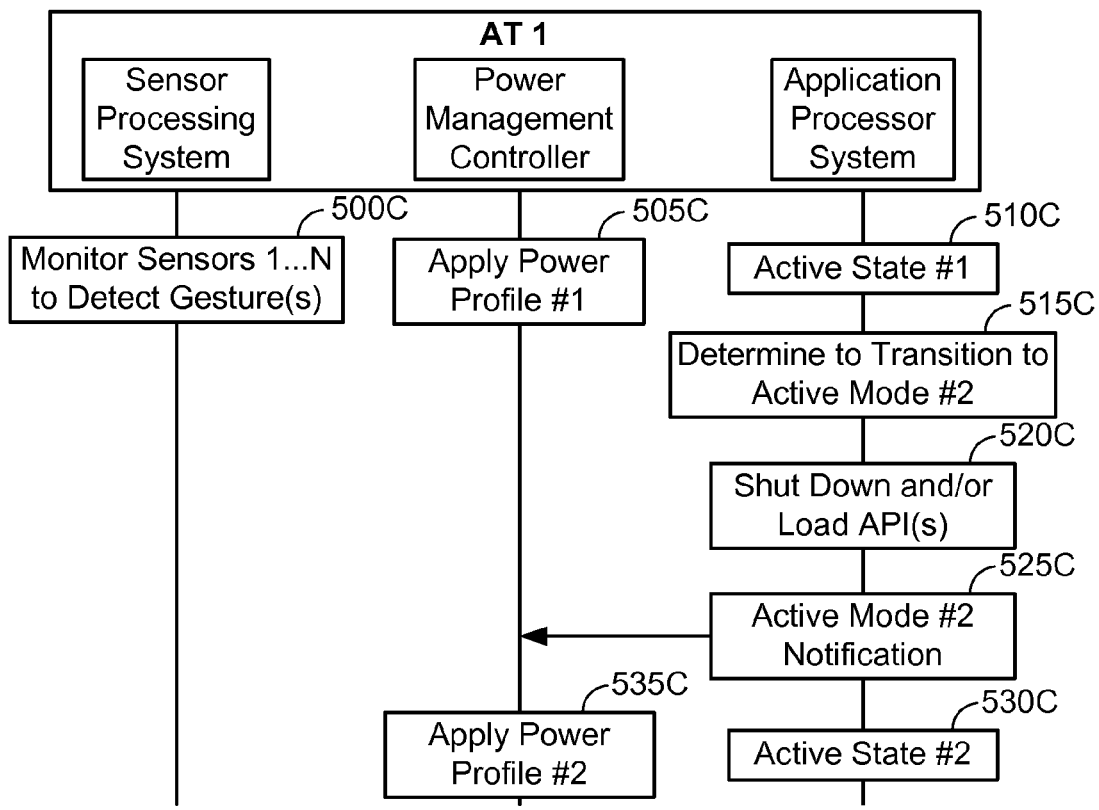
FIG. 5C illustrates another continuation of the process of FIG. 5A in accordance with another embodiment.

FIG. 5C illustrates another continuation of the process of FIG. 5A in accordance with another embodiment of the invention. Referring to FIG. 5C, assume that the process of FIG. 5A has executed, after which the sensor processor system 400A continues monitoring sensors 1 . . . N in order to detect gestures, 500C, the power management controller 440A is applying power profile #1 for powering the application processor system 430A, 505C, and the application processor system 430A is operating in active mode #1, 510C, which means API(s) associated with active mode #1 are being executed by the application processor system 430A.

Next, at some later point in time, the application processor system 430A determines to transition itself from active state #1 to active state #2, 515C, where active modes #1 and #2 are each either associated with different sets of API routines for execution, or with different hardware requirements. For example, active state #1 may be associated with a game API that requires a display of the application processing system 430A to be powered-up, whereas active state #2 may be associated with a music API that does not require the display to be powered up. In another example, active state #1 may be associated with a communication API that requires modem hardware to be powered-up for wireless communications, whereas active state #2 may be associated with a non-communicative API that does not require modem hardware to be powered-up. Also, the same API could use different hardware at different times, in which case transitions from one active mode to another active mode could occur without an API-change.

In the example of FIG. 5C, the determination of 515C is not based on a gesture detected by the sensor processor system 400A, but rather by the application processor system 430A itself. For example, the application processor system 430A may be requested by the user of AT 1 to load or shut down a certain API, an API being executed in active state #1 may have completed a download and no longer requires access to modem-hardware for wireless communications, etc.

In 520C, if necessary, the application processor system 430A shuts down APIs required for active state #1 and not required for active state #2, and/or loads APIs that are required for active state #2 and not required for active state #1. The application processor system 430A also sends a notification to the power management controller 430A to request that the power management controller 440A supply power in accordance with active state #2 as opposed to active state #1, 525C.

While 525C is shown as occurring after 520C in FIG. 5C, it will be appreciated that the order of these operations can be switched in other embodiments, such that the active state #2 notification is sent before the application processor system 430A shuts down and/or loads APIs in preparation for active state #2. Accordingly, the application processor 430A enters active state #2 in 530C, and the power management controller 440B applies a power profile for active-state #2, 535C.

Figure 5D:
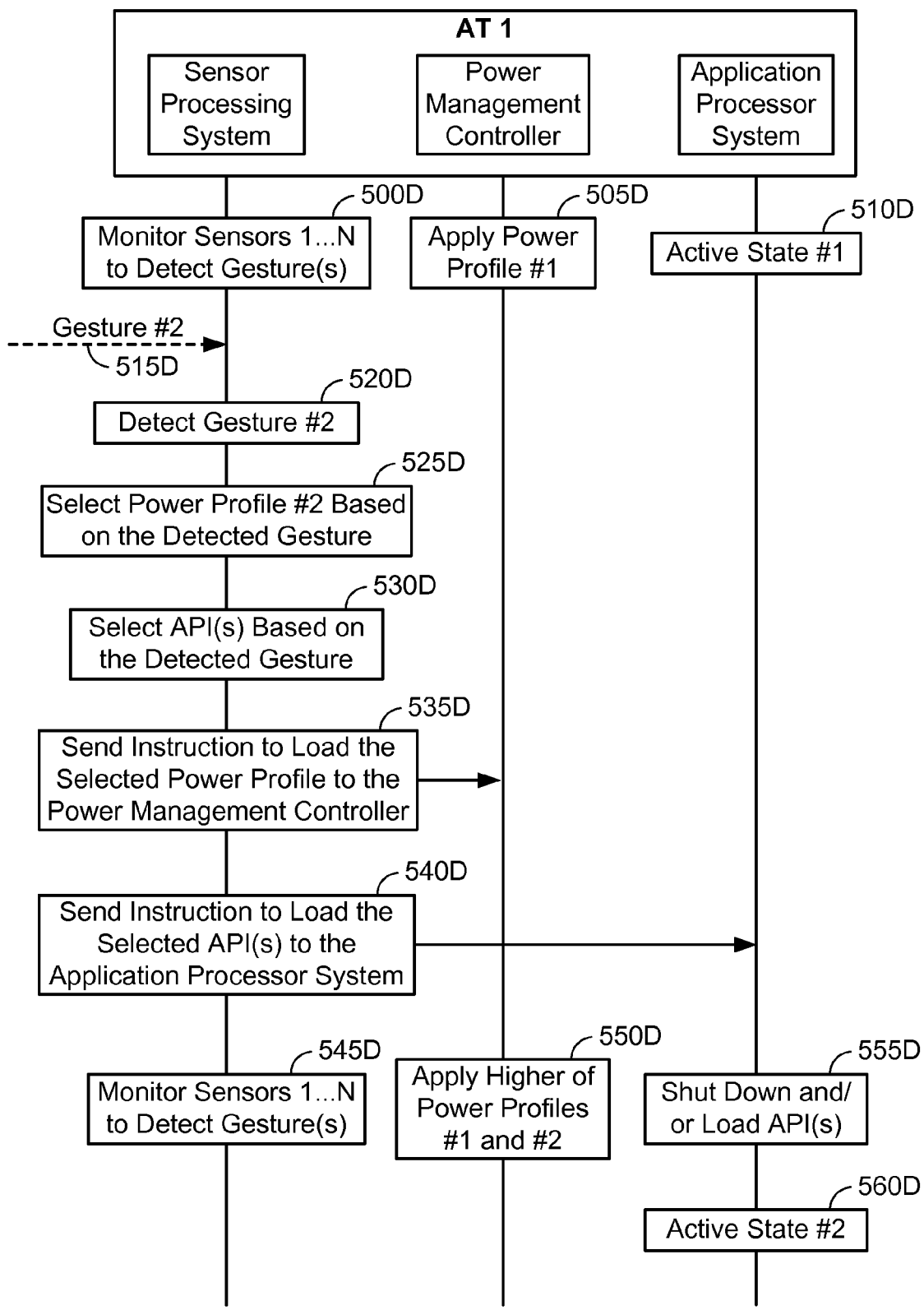
FIG. 5D illustrates yet another continuation of the process of FIG. 5A in accordance with another embodiment.

FIG. 5D illustrates yet another continuation of the process of FIG. 5A in accordance with another embodiment of the invention. Referring to FIG. 5D, as in FIGS. 5B and 5C, assume that the process of FIG. 5A has executed, after which the sensor processor system 400A continues monitoring sensors 1 . . . N in order to detect gestures, 500D, the power management controller 440A is applying power profile #1 for powering the application processor system 430A, 505D, and the application processor system 430A is operating in active mode #1, 510D, which means API(s) associated with active mode #1 are being executed by the application processor system 430A.

Referring to FIG. 5D, in 515D, assume that a user of AT 1 gestures AT 1 ("gesture #2") in a manner consistent with a different one of the plurality of pre-defined gestures known to the gesture recognition module 410A of FIG. 4A. Accordingly, one or more of sensors 1 . . . N detect a change to AT 1's environment from the gesture of 515D, and at least the one or more sensors report sensor data to the gesture recognition module 410A, which then detects or identifies the gesture from 515D based on the reported sensor data, 520A. In an example, the sensors 1 . . . N can simply all report on a continuous or periodic basis, or alternatively one or more of the sensors 1 . . . N can report from the sensors 1 . . . N can be event-triggered such that sensor data is only sent to the gesture recognition module 410A when a potential gesture is detected.

After detecting the gesture in 520D, the gesture recognition module 410A launches the power profile selection module 420A in order to select one of a plurality of power profiles that is associated with the identified, pre-defined gesture, 525D, and the gesture recognition module 410A also launches the API selection module to select API(s) that are associated with the identified, pre-defined gesture (if any), 530D. In an example, while described as separate modules, the modules 410A, 415A and 420A can correspond to a single software application executed by the sensor processor system 400A.

After making the power profile and API selections in 525D and 530D, the sensor processor system 400A sends an instruction to the power management controller 440A via the connection 425A that requests the power management controller 440A to load or implement the selected power profile, 535D, and the sensor processor system 400A also sends an instruction to the application processor system 430A via the connection 425A that requests the application processor system 430A to load the selected API(s), 540D.

After sending the instructions in 535D and 540D, the sensor processor system 400A resumes its monitoring of sensors 1 . . . N in order to detect any subsequent gestures, 545D. Upon receiving the instruction from 535D, the power management controller 440A applies the higher of the selected power profile ("power profile #1") and the current power profile ("power profile #1") to the application processor system 430A, 550D. In an example, the sensor processor system 400A detects gestures and knows power profiles that are required for correct operation of API(s) and/or hardware associated with the detected gestures. However, it is possible that the application processor system 430A is already engaged in other operations that require even more power. In this case, the power profile for the gesture will already be satisfied by the current power profile for the application processor system 430A, in which case the power profile need not change. Thus, the power profile of 550D corresponds to the higher of the power profile selected by the sensor processor system 400A in 525D and the current power profile from 505D.

As will be appreciated, these power profiles could also be 'merged' in 550D, resulting in a new power profile ("power profile #3") altogether. For example, assume power profile #1 powers the application processor at 8 Volts and does not power-up modem hardware at all, whereas power profile #2 powers the application processor at 4 Volts and also powers-up the modem hardware. In this case, operations associated with power profile #1 are expected to require 8 Volts, which will also satisfy the 4 Volt requirement of power profile #2. Thus, the power profiles #1 and #2 would be merged in this case, resulting in power profile #3 that applies 8 Volts to the application processor while also powering-up the modem hardware. Upon receiving the instruction from 540D, the application processor system 430A loads the selected API(s) if necessary, 555D, and thereby transitions from active state #1 into active state #2, 560D. Of course, in an alternative embodiment, the newer gesture (i.e., gesture #2 in 515D) could simply be configured to override any existing processes such that power profile #2 would be applied even if power profile #1 had higher power requirements.

While FIGS. 5A-5D each illustrate examples by which the sensor processor system is executing and at least partially controls the power profile applied to the application processor system or the modem processor, in an embodiment, the sensor processor system itself can begin its execution at the direction of the application processor system, in an example. For example, when the overall chipset of the access terminal is in off mode and then begins a power-up procedure, the application processor system will load the sensors processor system's internal memory with the sensors processor boot core. The sensors processor system will subsequently load the appropriate memory profile (initial state). After the initialization procedure is complete the sensors processor will enter its low power mode if there are no clients (application processors or modem processors) requesting sensors data or algorithm functionality. The sensor processor can be reset by the application processors in the case where its code is being serviced or upgraded.

Figure 6A:
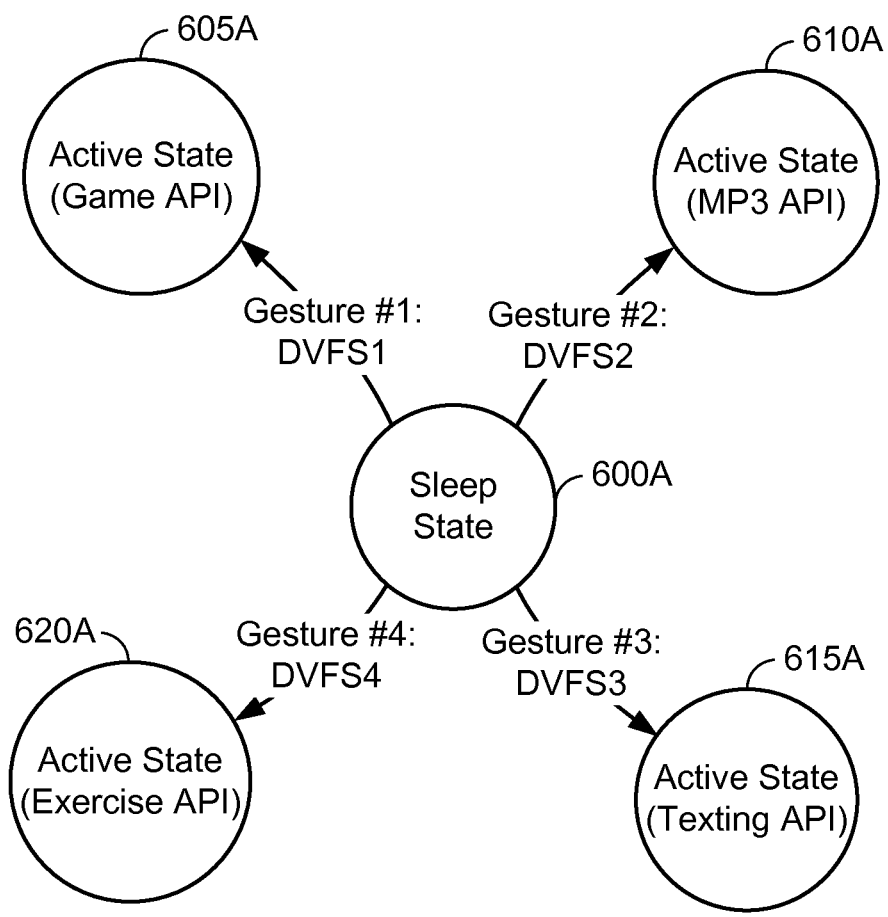
FIG. 6A illustrates a high-level state diagram of gesture-based state transitions in accordance with an embodiment.

FIG. 6A illustrates a high-level state diagram of gesture-based state transitions in accordance with an embodiment of the invention. Referring to FIG. 6A, from an initial sleep-state at 600A, AT 1 can transition into a number of different active states based on the type of gesture detected by the sensor processor system 400A. Accordingly, if a first gesture is detected ("DVFS1") by the sensor processor system 400A, the application processor system 430A of AT 1 is transitioned into an active state 605A whereby a game API is loaded for execution by the application processor system 430A. If a second gesture is detected ("DVFS2") by the sensor processor system 400A, the application processor system 430A of AT 1 is transitioned into an active state 610A whereby a music or MP3 API is loaded for execution by the application processor system 430A. If a third gesture is detected ("DVFS3") by the sensor processor system 400A, the application processor system 430A of AT 1 is transitioned into an active state 615A whereby a texting API is loaded for execution by the application processor system 430A. If a fourth gesture is detected ("DVFS4") by the sensor processor system 400A, the application processor system 430A of AT 1 is transitioned into an active state 620A whereby an exercise API is loaded for execution by the application processor system 430A.

As will be appreciated, in FIG. 6A, the application processor system 430A is transitioned directly from sleep-state into a specific active state responsive to the gesture detection or identification, which means the home-screen of AT 1 can be bypassed entirely and the particular APIs desired by the user can be executed more quickly, which saves time and consumes a lower amount of power as compared to loading a default home-screen and requiring the user to navigate further. Further, while FIG. 6A represents an example whereby a starting-state is the sleep-state and a target state corresponds to one of a plurality of active states, it will be appreciated that the 'start' state could be an active state in another embodiment. In this case, the active state could either transition to another active state or back into sleep-state based on gesture recognition, as described above.

Figure 6B:
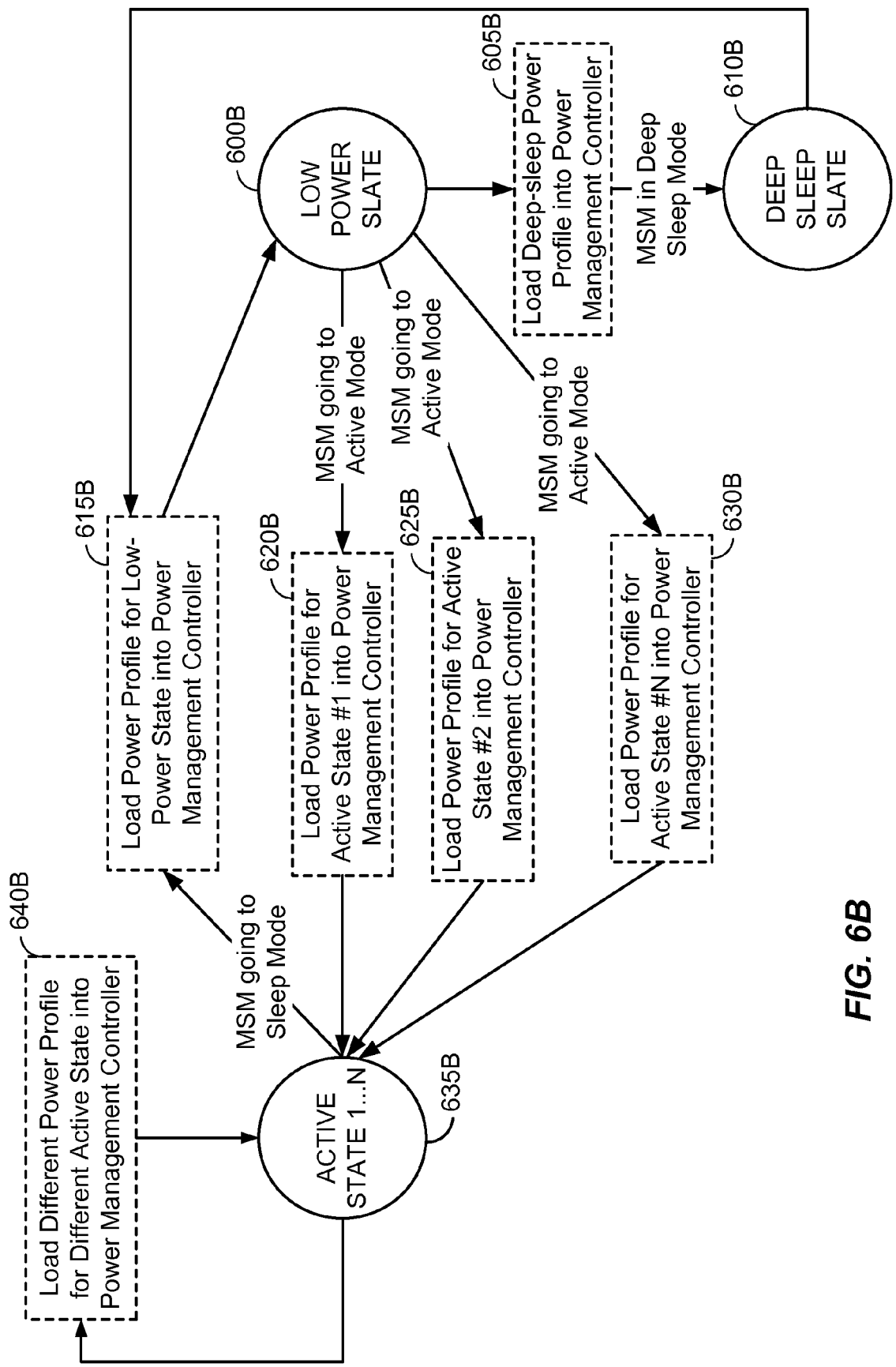
FIG. 6B illustrates another state diagram of gesture-based state transitions in accordance with an embodiment.

FIG. 6B illustrates another state diagram of gesture-based state transitions in accordance with an embodiment of the invention. In particular, FIG. 6B illustrates the power-profiles required for a target state of the application processing system 430A being loaded into the power management controller 440A during a state transition.

Referring to FIG. 6B, the application processing system 430A is operating in a low-power state in 600B. The low-power state of 600B can either be considered to be a sleep-state, or a low-power active state. From the low-power state of 600B, the application processing system 430A can be transitioned into one of active states 1 . . . N, or alternatively to a deep-sleep state with even lower power consumption than the low-power state.

Thus, in response to a gesture-detection that prompts the sensor processor system 400A to transition the application processing system 430A into the deep-sleep state from the low-power state of 600B, the sensor processor system 400A loads a deep-sleep power profile into the power management controller 440A in 605B. In an example, the loading of the deep-sleep power profile in 605B can correspond to 535D of FIG. 5D. The loading of a power profile may correspond to either an identification of the power profile to the power management controller 440A which itself stores the available power profiles, or alternatively to an actual loading of bits constituting the power profile from memory at the sensor processor system 400A into memory (not shown) contained on the power management controller 440A. In the latter case, the power management controller 440A would not be required to store all of the power profiles, but rather only a current power profile being applied, or perhaps a set of popular or frequently used power-profiles.

After loading the deep-sleep power profile into the power management controller 440A, the application processing system 430A is in deep-sleep state, 610B. From deep-sleep state 610B, the sensor processor system 400A may detect a gesture that prompts a transition of the application processing system 430A back to the low-power state, in which case the power-profile for the low-power state is loaded into the management controller 440A, 615B, after which the application processing system 430B resumes its operation in the low-power state or 'normal' sleep-state, 600B. While not shown in FIG. 6B, the application processor system 430A could also be transitioned directly from the deep sleep state to any of active states 1 . . . N in another embodiment of the invention. For example, depending on the platform capability, the sensor processor system 400A can go to deep sleep mode and then periodically wake up to monitor sensors and back to deep sleep mode if no gesture is detected. The application processor system and/or the modem subsystem can wake up on their own based on pre-defined sleep cycles selected by applications running on the application processor or modem processor. In an example, these scheduled wake up modes can be independent of the sensors processor wake-up mode.

From the low-power state of 600B, the application processing system 430A may be transitioned into any of active states 1 . . . N based on the type of gesture detected by the sensor processor system 400A. Accordingly, if gesture #1 associated with power profile #1 for active state #1 is detected, state 600B advances to 620B, if gesture #2 associated with power profile #2 for active state #2 is detected, state 600B advances to 625B, and so on, such that if a gesture #N associated with a power profile #N for active state #N is detected, state 600B advances to 630B. In each of 620B, 625B and 630B, the power profile associated with the detected gesture is loaded into the power management controller 430A, after which the application processing system 430A enters the associated active state, 635B.

In response to a sleep-state gesture detected by the sensor processor system 400A or a determination by the application processing system 430A to transition to sleep-state, state 635B advances to 615B, loads the low-power state profile into the power management controller 440A and then returns to sleep-state 600B. It is also possible for active state 635B to transition to a different active state 635B (e.g., as in FIG. 5C or 5D), by advancing to 640B where a different power profile is loaded into the power management controller 440A for a different active state, after which the application processing system 430A returns to state 635B for the new active state.

While above-described embodiments of the invention in part describe the APIs 435A of FIG. 4A as being controlled or called by the power profile, it will be appreciated that these embodiments can be interpreted as the APIs themselves being called or executed, or alternatively one or more applications or routines associated with the APIs being called or executed.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Non-transitory computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on non-transitory computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of controlling power consumption of a mobile device, comprising:
monitoring, at a sensor processor system of the mobile device, one or more sensors connected to the mobile device, the sensor processor system configured for low-power operation;
detecting one of a plurality of pre-defined gestures and one or more environmental conditions or events based on the monitoring, wherein each of the plurality of pre-defined gestures corresponds to one or more actions initiated by a user of the mobile device;

loading to an application processor system, operating independently from the sensor processor system, one or more applications associated with respective power requirements, the one or more applications selected from a plurality of available applications based on the detected one of the plurality of pre-defined gestures;

selecting one of a plurality of predetermined power profiles corresponding to the respective power requirements for the selected one or more applications based on the detected one of the plurality of pre-defined gestures to enable the mobile device to consume power at a level approximating the respective power requirements for the selected one or more applications, and loading the selected one of the plurality of predetermined power profiles to a power management controller to control power to the application processor system, wherein the selected one of the plurality of predetermined power profiles establishes at least one of (1) a clock frequency at which an application processor of the application processor system is to operate or (2) a current or voltage at which the application processor of the application processor system is to operate; and instructing the power management controller to apply the one of the plurality of predetermined power profiles corresponding to the respective power requirements for the selected one or more applications, selected based on the one of the plurality of pre-defined gestures detected by the independently operating sensor processor system, to the application processor system to control the power to the application processor system so as to support the respective power requirements of the one or more loaded applications selected based on the detected one of the plurality of pre-defined gestures.

2. The method of claim 1, wherein the monitoring is performed periodically by the sensor processor system.

3. The method of claim 1, wherein the one or more sensors include (a) a light sensor, (b) a pressure sensor, (c) a gyroscopic sensor, (d) an accelerometer, (e) a touch-screen proximity sensor, (f) a fingerprint sensor and/or (g) a haptic sensor.

4. The method of claim 1, wherein the one or more user-initiated actions includes (a) the user pressing a key or button of the mobile device, (b) the user walking or jogging with the mobile device, (c) the user picking up the mobile device from a surface or storage location, (d) the user placing the mobile device onto a surface or into a storage location, (e) a proximity of the user's fingers being close to a display of the mobile device and/or (f) the user moving into an airplane with the mobile device.

5. The method of claim 1, wherein the one or more environmental conditions or events includes (a) an amount of light in proximity to the mobile device, (b) a temperature in proximity to the mobile device, (c) an acceleration of the mobile device, (d) a velocity of the mobile device, (e) an altitude of the mobile device and/or (f) identifying one or more wireless transmitters in range of the mobile device.

6. The method of claim 1, wherein the selected one of the plurality of predetermined power profiles establishes whether a modem subsystem configured to manage wireless communications to or from the mobile device is turned on or off.

7. The method of claim 1, wherein the mobile device corresponds to a wireless mobile device that includes a modem subsystem to manage wireless communications to or from the wireless mobile device.

8. The method of claim 1, further comprising:
selecting the one or more applications for execution by the application processor system based on the detecting,
wherein the instructing step further instructs the application processor system to load the one or more applications.

9. The method of claim 8, wherein the one or more applications includes an audio application and the selected one of the plurality of predetermined power profiles provides power for at least audio circuitry of the mobile device.

10. The method of claim 8, wherein the one or more applications includes a texting or email application and the selected one of the plurality of predetermined power profiles provides power for at least display circuitry of the mobile device.

11. The method of claim 8, wherein the one or more applications includes a wireless communications application and the selected one of the plurality of predetermined power profiles provides power for a modem subsystem of the mobile device.

12. The method of claim 8, wherein the selected one of the plurality of predetermined power profiles is configured to provide a level of power that approximates a level of power required to support the one or more applications.

13. The method of claim 1, further comprising:
at the power management controller, determining that the application processor system has transitioned to a different mode of operation associated with a different power profile from among the plurality of power profiles; applying the different power profile to the application processor system.

14. The method of claim 13, wherein the different mode of operation is a sleep-mode and the different power profile is power profile associated with low-power requirements of the sleep-mode.

15. The method of claim 13, wherein the selected one of the plurality of predetermined power profiles is associated with a first active mode and the different mode of operation corresponds to a second active mode, the first and second active modes having different power requirements for the application processor system that are each higher than a sleep-mode power requirement for the application processor system.

16. The method of claim 1, wherein the power management controller is configured to selectively scale power consumption of specific hardware of the application processor system.

17. The method of claim 1, further comprising:
generating a new power profile by merging at least one of the plurality of power profiles with at least another of the plurality of power profiles.

18. The method of claim 1, further comprising:
in response to a determination that an application, from the selected one or more applications, has low-power requirements, loading the application to the sensor processor system, configured for low-power operation, so that the sensor processor system runs the application determined to have the low-power requirements and the application processor system runs at least one other of the one or more applications selected based on the detected one of the plurality of pre-defined gestures.

19. A mobile device, comprising:
an application processor system configured to execute at least one application;
a power management controller configured to control power consumption of the application processor system; and
a sensor processor system, configured for low-power operation, and further configured to:
monitor one or more sensors coupled to the mobile device, detect one of a plurality of pre-defined gestures and one or more environmental conditions or events based on the monitoring, wherein each of the plurality of pre-defined gestures corresponds to one or more actions initiated by a user of the mobile device, cause loading to the application processor system, operating independently from the sensor processor system, one or more applications associated with respective power requirements, the one or more applications selected from a plurality of available applications based on the detected one of the plurality of pre-defined gestures, select one of a plurality of predetermined power profiles corresponding to the respective power requirements for the selected one or more applications based on the detected one of the plurality of pre-defined gestures to enable the mobile device to consume power at a level approximating the respective power requirements for the selected one or more applications, and cause loading of the selected one of the plurality of predetermined power profiles to a power management controller to control power to the application processor system, wherein the selected one of the plurality of predetermined power profiles is configured to establish at least one of (1) a clock frequency at which an application processor of the application processor system is to operate or (2) a current or voltage at which the application processor of the application processor system is to operate, and instruct the power management controller to apply the one of the plurality of predetermined power profiles corresponding to the respective power requirements for the selected one or more applications, selected based on the one of the plurality of pre-defined gestures detected by the independently operating sensor processor system, to the application processor system to control power to the application processor system so as to support the respective power requirements of the one or more loaded applications selected based on the detected one of the plurality of pre-defined gestures.

20. The mobile device of claim 19, wherein the sensor processor system is configured to monitor the one or more sensors on a periodic basis.

21. The mobile device of claim 19, wherein the sensor processor system is configured to continue to monitor the one or more sensors when the application processor system transitions to a sleep-state.

22. The mobile device of claim 19, wherein the one or more sensors include (a) a light sensor, (b) a pressure sensor, (c) a gyroscopic sensor, (d) an accelerometer, (e) a touch-screen proximity sensor, (f) a fingerprint sensor and/or (g) a haptic sensor.

23. The mobile device of claim 19, wherein the one or more user-initiated actions includes (a) the user pressing a key or button of the mobile device, (b) the user walking or jogging with the mobile device, (c) the user picking up the mobile device from a surface or storage location, (d) the user placing the mobile device onto a surface or into a storage location, (e) a proximity of the user's fingers being close to a display of the mobile device and/or (f) the user moving into an airplane with the mobile device.

24. The mobile device of claim 19, wherein the one or more environmental conditions or events includes (a) an amount of light in proximity to the mobile device, (b) a temperature in proximity to the mobile device, (c) an acceleration of the mobile device, (d) a velocity of the mobile device, (e) an altitude of the mobile device and/or (f) identifying one or more wireless transmitters in range of the mobile device.

25. The mobile device of claim 19, wherein the selected one of the plurality of predetermined power profiles is configured to establish whether a modem subsystem configured to manage wireless communications to or from the mobile device is turned on or off.

26. The mobile device of claim 19, wherein the mobile device corresponds to a wireless mobile device that includes a modem subsystem to manage wireless communications to or from the wireless mobile device.

27. The mobile device of claim 19, wherein the sensor processor system is configured to select the one or more applications for execution by the application processor system based on the detection,
wherein the sensor processor system is further configured to instruct the application processor system to load the one or more applications.

28. The mobile device of claim 27, wherein the one or more applications includes an audio application and the selected one of the plurality of predetermined power profiles provides power for audio circuitry of the mobile device.

29. The mobile device of claim 27, wherein the one or more applications includes a texting or email application and the selected one of the plurality of predetermined power profiles provides power for display circuitry of the mobile device.

30. The mobile device of claim 27, wherein the one or more applications includes a wireless communications application and the selected one of the plurality of predetermined power profiles provides power for a modem subsystem of the mobile device.

31. The mobile device of claim 27, wherein the selected one of the plurality of predetermined power profiles is configured to provide a level of power that approximates a level of power required to support the one or more applications.

32. The mobile device of claim 19, wherein the power management controller is configured to determine that the application processor system has transitioned to a different mode of operation associated with a different power profile from among the plurality of power profiles, and to apply the different power profile to the application processor system.

33. The mobile device of claim 32, wherein the different mode of operation is a sleep-mode and the different power profile is power profile associated with low-power requirements of the sleep-mode.

34. The mobile device of claim 33, wherein the selected one of the plurality of predetermined power profiles is associated with a first active mode and the different mode of operation corresponds to a second active mode, the first and second active modes having different power requirements for the application processor system that are each higher than a sleep-mode power requirement for the application processor system.

35. A mobile device, comprising:
means for monitoring, at a sensor processor system of the mobile device, one or more sensors connected to the mobile device, the sensor processor system configured for low-power operation;
means for detecting one of a plurality of pre-defined gestures and one or more environmental conditions or events based on the monitoring, wherein each of the plurality of pre-defined gestures corresponds to one or more actions initiated by a user of the mobile device;
means for loading to an application processor system, operating independently from the sensor processor system, one or more applications associated with respective power requirements, the one or more applications selected from a plurality of available applications based on the detected one of the plurality of pre-defined gestures;

means for selecting one of a plurality of predetermined power profiles corresponding to the respective power requirements for the selected one or more applications based on the detected one of the plurality of pre-defined gestures to enable the mobile device to consume power at a level approximating the respective power requirements for the selected one or more applications, and means for loading the selected one of the plurality of predetermined power profiles to a power management controller to control power to the application processor system, wherein the selected one of the plurality of predetermined power profiles is further configured to establish at least one of (1) a clock frequency at which an application processor of the application processor system is to operate or (2) a current or voltage at which the application processor of the application processor system is to operate; and means for instructing the power management controller to apply the one of the plurality of predetermined power profiles corresponding to the respective power requirements for the selected one or more applications, selected based on the one of the plurality of pre-defined gestures detected by the independently operating sensor processor system, to the application processor to control power to the application processor system so as to support the respective power requirements of the one or more loaded applications selected based on the detected one of the plurality of pre-defined gestures.

36. The mobile device of claim 35, wherein the one or more sensors include (a) a light sensor, (b) a pressure sensor, (c) a gyroscopic sensor, (d) an accelerometer, (e) a touch-screen proximity sensor, (f) a fingerprint sensor and/or (g) a haptic sensor.

37. The mobile device of claim 35, wherein the one or more user-initiated actions includes (a) the user pressing a key or button of the mobile device, (b) the user walking or jogging with the mobile device, (c) the user picking up the mobile device from a surface or storage location, (d) the user placing the mobile device onto a surface or into a storage location, (e) a proximity of the user's fingers being close to a display of the mobile device and/or (f) the user moving into an airplane with the mobile device.

38. The mobile device of claim 35, wherein the one or more environmental conditions or events includes (a) an amount of light in proximity to the mobile device, (b) a temperature in proximity to the mobile device, (c) an acceleration of the mobile device, (d) a velocity of the mobile device, (e) an altitude of the mobile device and/or (f) identifying one or more wireless transmitters in range of the mobile device.

39. The mobile device of claim 35, wherein the selected one of the plurality of predetermined power profiles is configured to establish whether a modem subsystem configured to manage wireless communications to or from the mobile device is turned on or off.

40. The mobile device of claim 35, further comprising:
means for selecting the one or more applications for execution by the application processor system based on the detection,
wherein the means for instructing further instructs the application processor system to load the one or more applications.

41. The mobile device of claim 35, further comprising: means for determining that the application processor system has transitioned to a different mode of operation associated with a different power profile from among the plurality of power profiles; and means for applying the different power profile to the application processor system.

42. A mobile device, comprising:
logic configured to monitor, at a sensor processor system of the mobile device, one or more sensors connected to the mobile device, the sensor processor system configured for low-power operation;

logic configured to detect one of a plurality of pre-defined gestures and one or more environmental conditions or events based on the monitoring, wherein each of the plurality of pre-defined gestures corresponds to one or more actions initiated by a user of the mobile device;

logic configured to load to an application processor system, operating independently from the sensor processor system, one or more applications associated with respective power requirements, the one or more applications selected from a plurality of available applications based on the detected one of the plurality of pre-defined gestures;

logic configured to select one of a plurality of predetermined power profiles corresponding to the respective power requirements for the selected one or more applications based on the detected one of the plurality of pre-defined gestures to enable the mobile device to consume power at a level approximating the respective power requirements for the selected one or more applications, and load the selected one of the plurality of predetermined power profiles to a power management controller to control power to the application processor system, wherein the selected one of the plurality of predetermined power profiles is configured to establish at least one of (1) a clock frequency at which an application processor of the application processor system is to operate or (2) a current or voltage at which the application processor of the application processor system is to operate; and logic configured to instruct the power management controller to apply the one of the plurality of predetermined power profiles corresponding to the respective power requirements for the selected one or more applications, selected based on the one of the plurality of pre-defined gestures detected by the independently operating sensor processor system, to the application processor to control power to the application processor system so as to support the respective power requirements of the one or more loaded applications selected based on the detected one of the plurality of pre-defined gestures.

43. The mobile device of claim 42, wherein the one or more sensors include (a) a light sensor, (b) a pressure sensor, (c) a gyroscopic sensor, (d) an accelerometer, (e) a touch-screen proximity sensor, (f) a fingerprint sensor and/or (g) a haptic sensor.

44. The mobile device of claim 42, wherein the one or more user-initiated actions includes (a) the user pressing a key or button of the mobile device, (b) the user walking or jogging with the mobile device, (c) the user picking up the mobile device from a surface or storage location, (d) the user placing the mobile device onto a surface or into a storage location, (e) a proximity of the user's fingers being close to a display of the mobile device and/or (f) the user moving into an airplane with the mobile device.

45. The mobile device of claim 42, wherein the one or more environmental conditions or events includes (a) an amount of light in proximity to the mobile device, (b) a temperature in proximity to the mobile device, (c) an acceleration of the mobile device, (d) a velocity of the mobile device, (e) an altitude of the mobile device and/or (f) identifying one or more wireless transmitters in range of the mobile device.

46. The mobile device of claim 42, wherein the selected one of the plurality of predetermined power profiles is configured to establish whether a modem subsystem configured to manage wireless communications to or from the mobile device is turned on or off.

47. The mobile device of claim 42, further comprising:
logic configured to select the one or more applications for execution by the application processor system based on the detection,
wherein the logic configured to instruct further instructs the application processor system to load the one or more applications.

48. The mobile device of claim 42, further comprising: logic configured to determine that the application processor system has transitioned to a different mode of operation associated with a different power profile from among the plurality of power profiles; and logic configured to apply the different power profile to the application processor system.

49. A non-transitory computer-readable storage medium containing instructions stored thereon, which, when executed by a mobile device, cause the mobile device to perform operations, the instructions comprising:
program code to monitor, at a sensor processor system of the mobile device, one or more sensors connected to the mobile device, the sensor processor system configured for low-power operation;
program code to detect one of a plurality of pre-defined gestures and one or more environmental conditions or events based on the monitoring, wherein each of the plurality of pre-defined gestures corresponds to one or more actions initiated by a user of the mobile device;
program code to load to an application processor system, operating independently from the sensor processor system, one or more applications associated with respective power requirements, the one or more applications selected from a plurality of available applications based on the detected one of the plurality of pre-defined gestures;
program code to select one of a plurality of predetermined power profiles corresponding to the respective power requirements for the selected one or more applications based on the detected one of the plurality of pre-defined gestures to enable the mobile device to consume power at a level approximating the respective power requirements for the selected one or more applications, and load the selected one of the plurality of predetermined power profiles to a power management controller to control power to the application processor system, wherein the selected one of the plurality of predetermined power profiles is configured to establish at least one of (1) a clock frequency at which an application processor of the application processor system is to operate or (2) a current or voltage at which the application processor of the application processor system is to operate; and
program code to instruct the power management controller to apply the one of the plurality of predetermined power profiles corresponding to the respective power requirements for the selected one or more applications, selected based on the detected one of the plurality of pre-defined gestures, to the application processor system to control power to the application processor system so as to support the respective power requirements of the one or more loaded applications selected based on the detected one of the plurality of pre-defined gestures.

50. The non-transitory computer-readable storage medium of claim 49, wherein the one or more sensors include (a) a light sensor, (b) a pressure sensor, (c) a gyroscopic sensor, (d) an accelerometer, (e) a touch-screen proximity sensor, (f) a fingerprint sensor and/or (g) a haptic sensor.

51. The non-transitory computer-readable storage medium of claim 49, wherein the one or more user-initiated actions includes (a) the user pressing a key or button of the mobile device, (b) the user walking or jogging with the mobile device, (c) the user picking up the mobile device from a surface or storage location, (d) the user placing the mobile device onto a surface or into a storage location, (e) a proximity of the user's fingers being close to a display of the mobile device and/or (f) the user moving into an airplane with the mobile device.

52. The non-transitory computer-readable storage medium of claim 49, wherein the one or more environmental conditions or events includes (a) an amount of light in proximity to the mobile device, (b) a temperature in proximity to the mobile device, (c) an acceleration of the mobile device, (d) a velocity of the mobile device, (e) an altitude of the mobile device and/or (f) identifying one or more wireless transmitters in range of the mobile device.

53. The non-transitory computer-readable storage medium of claim 49, wherein the selected one of the plurality of predetermined power profiles is configured to establish whether a modem subsystem configured to manage wireless communications to or from the mobile device is turned on or off.

54. The non-transitory computer-readable storage medium of claim 49, further comprising:
program code to select the one or more applications for execution by the application processor system based on the detection,
wherein the program code to instruct is configured to instruct the application processor system to load the one or more applications.

55. The non-transitory computer-readable storage medium of claim 49, further comprising: program code to determine that the application processor system has transitioned to a different mode of operation associated with a different power profile from among the plurality of power profiles; and program code to apply the different power profile to the application processor system.

* * * * *